US011288736B1

(12) United States Patent
Jette et al.

(10) Patent No.: US 11,288,736 B1
(45) Date of Patent: Mar. 29, 2022

(54) BLOCKCHAIN-BASED SHARED APPRECIATION NOTE

(71) Applicant: Homium, LLC, Sherman Oaks, CA (US)

(72) Inventors: David Jette, Los Angeles, CA (US); Brett Markinson, Sherman Oaks, CA (US)

(73) Assignee: Homium, LLC, Sherman Oaks, CA (US)

( * ) Notice: Subject to any disclaimer, the term of this patent is extended or adjusted under 35 U.S.C. 154(b) by 0 days.

(21) Appl. No.: 16/372,547

(22) Filed: Apr. 2, 2019

(51) Int. Cl.
*G06Q 40/02* (2012.01)
*H04L 9/32* (2006.01)
*G06F 9/455* (2018.01)
*H04L 9/06* (2006.01)

(52) U.S. Cl.
CPC ....... *G06Q 40/025* (2013.01); *G06F 9/45558* (2013.01); *H04L 9/0637* (2013.01); *H04L 9/3213* (2013.01); *G06F 2009/45595* (2013.01); *H04L 2209/38* (2013.01); *H04L 2209/56* (2013.01)

(58) Field of Classification Search
CPC ...... G06F 9/45558; G06F 2009/45595; G06Q 40/025; H04L 9/0637; H04L 9/3213; H04L 2209/38; H04L 2209/56
USPC .......................................................... 705/50
See application file for complete search history.

(56) References Cited

U.S. PATENT DOCUMENTS

| | | | |
|---|---|---|---|
| 2017/0017958 A1* | 1/2017 | Scott ...................... | G06Q 20/12 |
| 2018/0218176 A1* | 8/2018 | Voorhees .............. | H04L 9/3213 |
| 2019/0028276 A1* | 1/2019 | Pierce ................... | H04L 9/3234 |
| 2020/0250683 A1* | 8/2020 | Padmanabhan ...... | G06Q 20/389 |

OTHER PUBLICATIONS

Ron White, How Computers Work, Oct. 15, 2003, Paul Boger, Illustrated by Timothy Edward Downs, 7th Edition (Year: 2003).*

* cited by examiner

*Primary Examiner* — Mohammad A. Nilforoush
*Assistant Examiner* — Wodajo Getachew
(74) *Attorney, Agent, or Firm* — Sheppard Mullin Richter & Hampton LLP

(57) ABSTRACT

Blockchain-based systems and methods related to creating and distributing cryptographically secure, digital tokens representing equity in assets corresponding to loan agreements. The system may comprise a transaction interface portal configured to collect and manage information pertaining to the origination of a loan agreement or a token transaction agreement. The system may include an underwriting smart contract configured to autonomously verify the value of an asset corresponding to a loan origination based at least partially on information not originating on the blockchain. The system may deliver tokens through a programmable escrow wallet configured to deliver tokens to buyers upon the satisfaction of encoded regulatory criterion. The system may be configured to determine the price of one or more tokens before delivery and adjust the price based at least on the appreciating value of the assets corresponding to the loan agreements and the number of tokens retired by the system.

35 Claims, 10 Drawing Sheets

BLOCKCHAIN-BASED SHARED APPRECIATION NOTE

FIELD OF THE INVENTION

The field of the invention is a blockchain-based platform using smart contracts and cryptographically secure token technology to facilitate and securely implement a pool of shared appreciation notes (SANs).

BACKGROUND OF THE INVENTION

Many individuals desire to tap into the equity in their home, but do not want to or cannot do so via a traditional home equity loan or refinance. A form of shared appreciation note (SAN) has emerged as an alternative.

With SANs, the homeowner commits a percent of their home's eventual sale price, instead of paying an interest rate. The homeowner owes no interest and makes no payments during the term of the loan. When the homeowner sells or refinances their home, the amount due is calculated based on their new home value. The lender's share of the home's appreciation is equal to the principal value of the original loan divided by the agreed-upon starting value of the home. In this way, the interests of the lender and borrower are aligned. If the home increases in value, the homeowner owes the loan principal, plus a percentage of their home's appreciation. If the home loses value, the homeowner repays only the principal, meaning they received an effectively interest free loan. In this way, the SAN stands in as a type of preferred equity in the home. While known SANs provide some advantages over home equity loans or refinancing, they suffer various drawbacks in that they are not easily transferrable, verified, or liquidated, due in part to the lack of technological sophistication in how they are processed and implemented.

Real estate is the largest asset class in the world, with owner-occupied single-family real estate leading the way. Existing "real estate-backed" tokens are single-use, meaning they are issued to represent a share of equity in only a specific project, then are bought back and retired when that project is closed. This forces investors to individually underwrite each token issuance, limiting their liquidity and flexibility, and making them no more efficient than their paper-bound counterparts (REITs and LPs).

SUMMARY OF THE INVENTION

The invention overcomes these and other drawbacks of known tokenized loans and provides a blockchain-based platform using smart contracts and cryptographically secure digital token technology to facilitate and securely implement a new approach to the SAN.

According to one aspect of the invention, a novel technology platform is architected and configured to enable a different type of shared equity investment vehicle to facilitate the creation and implementation of shared equity investing. Rather than creating a single SAN for a single property, one aspect of the invention relates to creating a set of cryptographically secure tokens implemented via a blockchain ledger that represents a uniformly underwritten representation of home equity for a pool of properties, where the tokens are collectively backed by the equity in the pool of underlying assets.

According to one aspect of the invention the technology platform may comprise an online portal through which various parties interact and backend technology for processing information in the manner described. An applicant (e.g., homeowner) my access the portal to submit an application request. The portal receives homeowner loan information and (loan documents, title, appraisal, etc.). An underwriting compliance smart contract, commonly referred to as an "oracle," performs validation of home value and determines max amount of loan available to homeowner and whether the home meets criteria stored as rules. If the criteria are met, the oracle performs final validation, and generates a signal indicating completion of the application phase and the beginning of an escrow phase.

In the escrow phase, a digital escrow module receives token purchase documents (e.g., from a market maker and a trust), which represents a promise to mint tokens upon closing of the loan. The trust approves minting of tokens via a smart contract, and the tokens are sent to escrow. Upon confirmation by a closing agent of receipt of funds into escrow from a market maker and that any necessary documents are received and conditions satisfied, the loan closes transferring funds to homeowner and the smart contract releases tokens to the market maker.

The collective equity of each underling property may be pooled. At the end of each reporting period the system will calculate and record the ratio ($\hbar$) of its qualified portfolio value and the number of tokens outstanding. The qualified assets include all promissory notes for loans made or purchased by the trust, plus all cash received from the repayment of those loans, including principal, interest earned through appreciation or default, fees, and surrendered collateral.

Once the above ratio $\hbar$ is calculated, the system adjusts the Oracle to reflect this new value. New tokens will thereafter be minted at a different ratio than it was before. This relationship is built into the smart contracts which govern the tokens' creation. The following equation is used when minting new tokens:

Number of Tokens Minted=Loan Amount/$\hbar$

After the reporting period, all qualified assets are earmarked to purchase tokens at the new price of $\hbar$ using qualified cash proceeds to mint and retire tokens from new loans, effectively replacing collateral through origination. All redeemed and retired tokens are sent to an inaccessible, 'dead' Ethereum address which removes them from circulation permanently. Tokens may be burned or retired in other ways. In this way, tokens the Trust acquires by purchase, or through new originations, are instantly removed from circulation and decrease the total number of outstanding tokens.

Shared appreciation notes can be securitized by ensuring the fidelity of the appraised values of onboarded homes, then by issuing a digital token that represents each dollar of home value thusly secured. In this way, SANs can be tokenized into a single, fungible, real-estate backed digital asset with an audit trail registered on both title and a public blockchain.

Shared appreciation notes can be securitized by ensuring the fidelity of the appraised values of onboarded homes, then by issuing a digital token that represents each dollar of home value thusly secured. In this way, SANs can be tokenized into a single, fungible, real-estate backed digital asset with an audit trail registered on both title and a public blockchain. A third-party trust can mint the digital token backed by its portfolio of SANs, then sell that token to market makers to enable a better alternative to the traditional home equity loan.

Each loan transaction can be standardized and recorded on a public blockchain (token minting and transfers) as well as at the county recorder's office (lien on title) as well as in an easily accessible secured database so that investors know that every token is backed by a real dollar's worth of home equity, in somebody's actual home. By working with licensed lenders and third-party appraisers, storing loan documents to an auditable database, and recording relevant public data on a blockchain in real-time, token buyers know the token holds intrinsic value from the moment of its creation, independent of speculation or the success of any one company or subset of users. Because the loan assets themselves are held by a third-party, mutual benefit corporation, token buyers know that when loans are repaid, cash proceeds are exclusively used to back up the token's intrinsic value.

Instances of the crypto token can be created when a homeowner commits a portion of the sale price of their home for cash, in the form of a SAN. The note is secured by a lien on the property and a loan agreement, filed at the local recorder's office. When the value of the home rises, so does the amount the Borrower must repay when it is sold. The beneficiary of the lien is a mutual benefit trust, an independent fiduciary entity that issues all new tokens at the time they are needed to fund new loans. These tokens are issued 1:1 with the dollar amount of the new loan, and then purchased by market makers seeking to hold and trade in digital currencies. The tokens are transferred to the market maker only after the loan has been funded and the lien recorded. The transaction is brokered through a smart contract on a public blockchain.

Notes backing the token are originated through a smart-contract regulated process which requires an independent appraisal of all home values and automated assessment and confirmation of the value via a value determination algorithm. Data may be automatically fed to the algorithm via an oracle or other data source that includes home value data (e.g., from a public database such as Zillow).

According to one aspect of the invention, the technology platform is configured to ensure the fidelity of the appraised values of onboarded homes for which a homeowner applies for a SAN by using an automated algorithmic approach to determining the value of the home and apply the results to a stored set of rules that define criteria that determine whether a home qualifies for the SAN. If not, the application is rejected. If the criteria are satisfied then the process can proceed. For each SAN, the system may be configured to issue a set of digital tokens, where each token represents a fixed dollar amount of home value to be secured. For simplicity, each token may represent a dollar of home value thusly secured. Other ratios could be sued. In this way, SANs can be tokenized into a single, fungible, real-estate backed digital asset with an audit trail registered on both title and a public blockchain.

More specifically as one example, the process implemented by the platform may include one or more of the following steps. A third-party trust can mint the digital token backed by its portfolio of SANs, then sell that token to market makers to enable a better alternative to the traditional home equity loan. Each loan transaction can be standardized and recorded on a public blockchain (token minting and transfers), as well as at the county recorder's office (lien on title) as well as in an easily accessible secured database so that investors know that every token is backed by a real dollar's worth of home equity, in somebody's actual home.

Tokens are created when a homeowner commits a portion of the sale price of their home for cash, in the form of a SAN. The note is secured by a lien on the property and a loan agreement, filed at the local recorder's office. When the value of the home rises, so does the amount the Borrower must repay when it is sold.

The tokens may be a uniform asset backed by the combined value of all committed equity. Unlike other real estate-backed digital tokens, the tokens do not represent an interest any specific property or address. All new originations create the same token at the same ration (e.g., $1 of value per token). Even though every token is created simultaneously with the extension of a specific home loan at a standardized value, the market maker is not buying an interest in that or any specific loan or home. Each token is "minted" with the same value and is identical to any other token. This allows investors to rely on the Trust and its portfolio, the county's title records, and the origination smart contracts as a triple source of truth and security for the token's intrinsic value, without having to underwrite specific transactions, properties, borrowers, or projects. This fungibility makes these tokens a reliable and useful representation of home equity on a public blockchain.

According to another aspect of the invention, a number of tokens are retired or "burned" when a home is sold, the loan is repaid, and proceeds are used to purchase and retire outstanding tokens at the published rate of exchange. The token value changes when loans are repaid and tokens are retired, by a rate proportional to the realized appreciation in the trust's portfolio. When home values appreciate, the ratio of qualified assets to outstanding tokens increases. The trust smart contract is programmed to buy and issue tokens at this new rate.

According to aspects of the invention, the disclosed platform may comprise a computerized system for securely generating and distributing cryptographically secure, digital tokens associated with a loan the system comprising a transaction portal comprising. In implementations, the transaction portal may comprise a user interface configured to receive input from one or more parties interacting with a blockchain network. In implementations, at least a portion of the received input may be recorded on the blockchain network. Information may include information pertaining to a loan origination transaction, information associated with the value of an asset, or a confirmation from one or more identified parties in the form of a digital authentication. In implementations, the parties may interact with the blockchain network through the transaction portal, a web3 bridge such as Metamask, or a combination of the two.

In implementations, the system may comprise a virtual machine operating on the blockchain network configured to execute computer-readable code. In certain implementations, the virtual machine may comprise the Ethereum Virtual Machine, or similar programmable blockchain-based virtual machines. In embodiments, the executable computer-readable code may comprise one or more smart contracts operating on the blockchain network to perform functions requiring input from one or more parties interacting with the system.

The system may be configured to generate a token transaction agreement using information pertaining to a loan origination transaction, wherein the loan origination transaction information may comprise a loan amount, an appraised asset value, a combined loan-to-value ratio corresponding to the loan origination, information corresponding to the location of the asset, an identification of an originator associated with the loan information, and a verification of a credential of the originator. As disclosed herein, the token transaction agreement may comprise an identification, such as a public address, on the blockchain network.

The system may be configured to identify one or more parties to the token transaction agreement, including at least a purchaser, an administrator, and a third party validator. In certain implementation, the system may be configured to receive an authenticated digital confirmation recorded on the blockchain network from one or more parties to the token transaction agreement, wherein the authenticated digital confirmation is received through input provided on the transaction portal.

In embodiments, the system may be configured to receive an authenticated digital confirmation recorded on the blockchain network from the third party representing an approval of the loan origination transaction. As disclosed herein, the third party may be an "oracle" smart contract. In embodiments, the third party may be configured to approve a loan origination transaction based on an asset value validation, the asset value validation comprising receiving information pertaining to the value of the asset from one or more sources not originating on the blockchain network, such as a housing price index, and validating the value of the asset based on the received information. In implementations, the asset value validation may comprise determining that a combined loan-to-value ratio corresponding to the loan origination exceeds a threshold value. In certain implementations, the oracle smart contract may determine a max loan amount for a given transaction based on an asset value validation.

The system may be configured to determine distribution information associated with the distribution of tokens to one or more parties to the token transaction agreement, the distribution information comprising a number of tokens to be generated in the token transaction agreement and an allocation of tokens to the one or more identified parties. In implementations, the allocation of tokens to a purchaser, or a market maker, may be based on a transaction amount, such as an amount invested by a purchaser.

The system may be configured to generate one or more cryptographically secure, digital tokens based on the distribution information and deliver the tokens to the one or more identified parties based on at least the information associated with the distribution of tokens. In implementations, the system may be configured to deliver tokens to one or more purchasers of the tokens. In other implementations, the system may be configured to deliver the one or more tokens, or other digital currency, to one or more other identified parties as a service fee.

In various embodiments, the system may be configured to receive an authenticated digital confirmation recorded on the blockchain network from an administrator of the system to generate the token transaction agreement. In such cases, the administrator may have permissions to transmit confirmations that are different from the third party validator. That is, the administrator may be the only party able to generate the token transaction agreements.

The system may be configured to receive an authenticated digital confirmation recorded on the blockchain network from one or more purchasers indicating a confirmation to purchase tokens. In such embodiments, the confirmation may represent an agreement to the token purchase agreement or an agreement that is based on the token transaction agreement. In embodiments, the transaction may comprise a transaction amount total and a transaction amount for each individual purchaser.

In implementations, the system may be configured to generate an escrow account that is configured to enable the transfer of tokens when one or more conditions have been verified. In such cases, the escrow account may comprise a smart contract that is programmed to hold onto tokens until certain criteria have been met. In implementations, the escrow account may transfer the generated tokens to a purchaser, or several purchasers, after a condition has been verified. In implementations, such a verification may comprise a verification that a threshold period of time has elapsed since one or more tokens were received by the escrow account. In implementations, a verification may comprise a verification in the form of a digital authentication from an identified party that regulatory criteria have been satisfied, for example, a regulation imposed by regulatory authorities such as the Securities and Exchange Commission.

The system may also be configured to receive a verification in the form of a digital authentication from an identified closing agent, wherein the verification represents a confirmation that the loan origination transaction has closed. In such cases, the closing agent may determine that a loan transaction has closed based on information not stored on the blockchain.

In implementations, the system may generate, create, or mint tokens. As discussed herein, a smart contract may create cryptographically secure, digital tokens on a blockchain network in response to an authenticated digital verification from one or more of the identified parties. In other implementations, a smart contract may mint tokens by transferring them to an address in response to an authenticated digital verification from one or more of the identified parties.

In embodiments, the system may comprise a smart contract stored on the blockchain configured to store information pertaining to the token transaction agreements, a number of generated tokens, the price of a token, identification information for one or more identified parties, information pertaining to one or more transactions occurring on the system. In such cases, the smart contract may serve as a registry for information of importance for the one or more operations described herein. In certain implementations, a verification of the information stored in the storage smart contract may be necessary for the fulfillment of a condition.

In implementations, the system may be configured to determine the price of the tokens created by the system. In certain implementations, the price may be determined by one or more participants of the system who deliver the price as input to the blockchain. In other embodiments, the price may be determined by executable code stored on the blockchain configured to retrieve, calculate, and determine certain variables corresponding to the price of the tokens. In implementations, the price of the token may be based on a qualified value corresponding to a loan amount, a qualified cash value corresponding to an available amount of cash, the total number of tokens generated by the system, and the total number of tokens retired by the system. The price of a token may be directly proportional to the value of qualified assets and inversely proportional to the number outstanding tokens. The number of tokens to be generated in the token transaction agreement may depend on the determined token price.

The system may be configured to retire tokens once they are purchased by an administrator. In embodiments, the system may be configured to receive an authenticated digital confirmation recorded on the blockchain network from an administrator of the system representing a purchase of one or more tokens at the determined token price. Once the tokens have been purchased by the administrator, the token may be retired an account configured to restrict the transfer of the one or more purchased tokens. In such embodiments, the tokens are said to be retired because they are removed from circulation.

DETAILED DESCRIPTION

In the following description, for the purposes of explanation, numerous specific details are set forth in order to provide a thorough understanding of the implementations of the disclosure. It will be appreciated, however, by one skilled in the art that the implementations of the disclosure may be practiced without these specific details or with an equivalent arrangement. In other instances, well-known structures and devices are shown in block diagram form in order to avoid unnecessarily obscuring the implementations of the disclosure. It should be noted that features (e.g., components, operations, or other features) described herein may be implemented separately or in combination with one another. For example, examples relating to blockchain functionality may be disclosed below, however the claimed system does not require any particular implementation of blockchain technology or distributed ledger technology.

Figure 1:
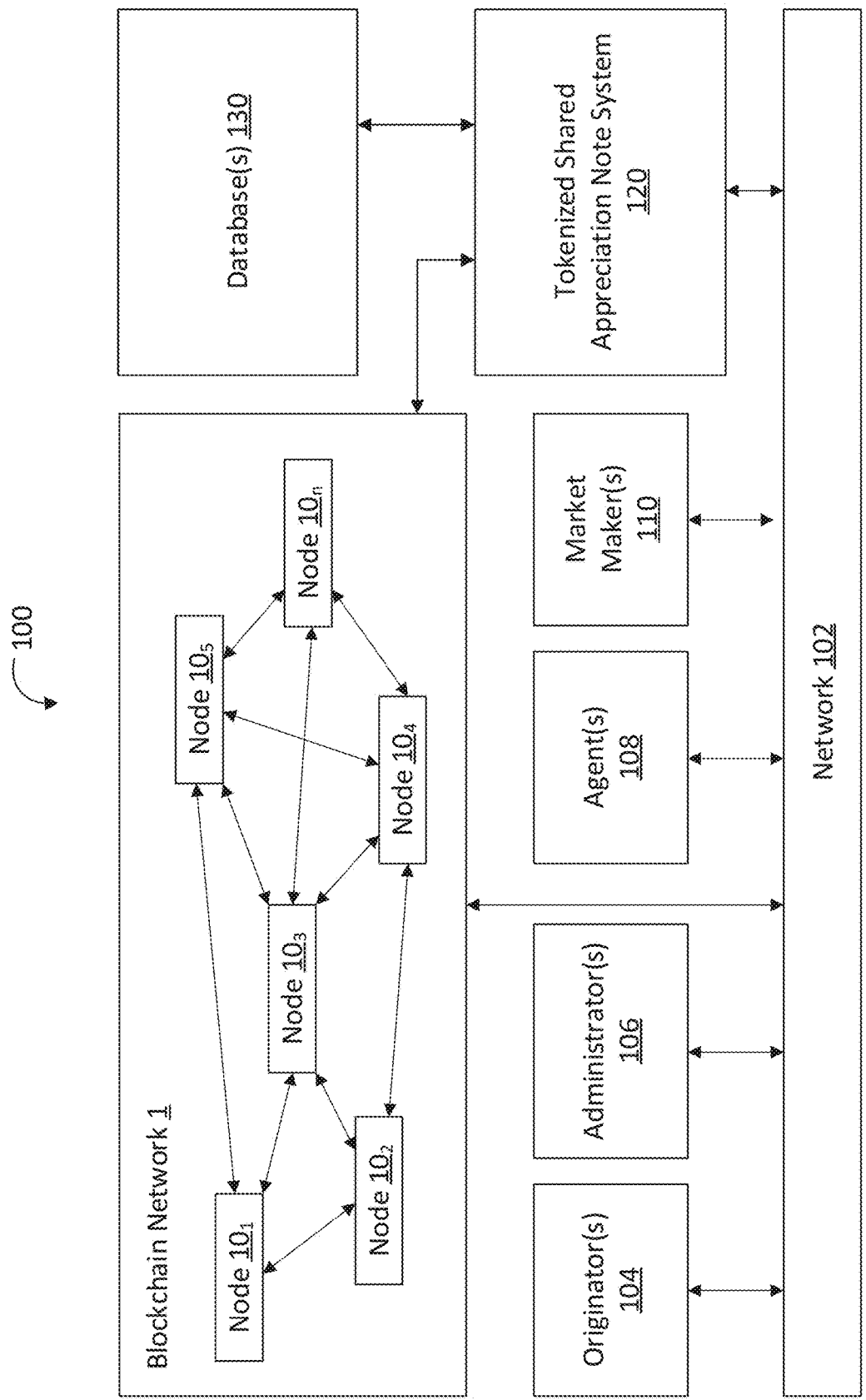
FIG. 1 illustrates a diagram of a blockchain network utilized by the tokenized shared appreciation note system in accordance with the embodiments disclosed herein.

FIG. 1 illustrates a block diagram of an example of a system 100 configured to securely manage the tokenized shared appreciation note system 120, in accordance with one or more implementations of the invention. In various implementations, system 100 may be configured to implement a SAN system, which may be a blockchain-based SAN system. The SAN system may be configured to securely manage the tokenization, allocation, distribution, and execution of tokenized shared appreciation notes. A tokenized SAN may represent a digital asset backed by loans tied to homeowner equity or equity in any physical or intangible asset. A tokenized SAN may comprise a non-fungible cryptographic token. Acquisition of the tokenized SAN may be performed via a consumer portal or via a secure multi-function wallet. Redemption of the tokenized shared appreciation notes may be performed via a secure, multi-function wallet or via a website.

In various implementations, information related to the acquisition and redemption of tokenized shared appreciation notes via the tokenized shared appreciate note system 120 may be stored in one or more databases 130. For example, transaction information may be recorded to one or more auditable databases 130 along with loan documents associated with one or more tokenized shared appreciation notes. In some implementations, the transaction information may also be recorded to a blockchain, thereby creating an immutable record of transactions and documents related to a tokenized shared appreciation note. In some implementations, the blockchain itself may act as a control to ensure that rules of the tokenized shared appreciate note system 120 are implemented. In some implementations, the transaction information may be recorded to a public blockchain, a private, permissioned blockchain, or a combination of a public and private permissioned blockchains.

System 100 may include a blockchain network 1 composed of multiple nodes 10 (e.g., node 101, node 102, ..., and/or node 10n), one or more databases 130, one or more originators 104, administrators 106, agents 108, one or more market makers (or purchasers) 110, a tokenized shared appreciate note system 120, and/or one or more other components. The one or more databases 130 may comprise a set of databases configured to store information related to the tokenization, allocation, distribution, execution, purchase, and transfer of tokenized shared appreciate notes via the tokenized shared appreciate note system 120. The one or more databases 130 may comprise one or more databases as shown as and described herein. In various implementations, the tokenized SAN system described herein may be configured to write transaction data to one or more transaction databases of one or more databases 130 and record information in one or more other databases of one or more databases 130. In various implementations, transaction data may be written to a blockchain or other distributed ledger in addition to, or instead of, being written to the one or more transaction databases of one or more databases 130. Transactions may consist of digital transfers of tokens, authenticated confirmation by use of a user's private key, or any other change in the state of a virtual machine operating on the blockchain network 1.

The components of system 100 may be in communication with one another via a network 102. As used herein, for convenience, the tokenized shared appreciation note 120 will be described as communicating with or otherwise exchanging information with one or more originators 104, one or more administrators 106, one or more agents 108, one or more market makers (or purchasers) 110, and/or one or more additional third parties, when, in fact, tokenized shared appreciate note system 120 communicates with or otherwise exchanges information with devices of the one or more originators 104, the administrators 106, the agents 108, the market makers 110, and/or the one or more additional third parties connected to tokenized shared appreciation note system via network 102.

The multiple nodes 10 of blockchain network 1 may comprise a set of peers to which a ledger is distributed. This ledger is said to be "decentralized" because it is replicated across the many network participants/peer (e.g., multiple nodes 10), each of whom may collaborate and/or cooperate in its maintenance. Blockchains themselves are decentralized ledgers as they are distributed amongst the nodes of a network. Transactions or state information committed to a decentralized ledger (or blockchain) may comprise verified transactions or data relating to a tokenized shared appreciation note. A block is a part of a blockchain, in which some or all of the recent transactions may be recorded. Once completed, a block is stored in the blockchain as a permanent database. Each time a block gets completed, a new one is generated. Each block in the blockchain is connected to the others (like links in a chain) in proper linear, chronological order. Every block contains a hash of information contained within the previous block which indicates the previous states of the blockchain. As a result, the blockchain may comprise information about different user addresses and their ownership of a tokenized asset from the first "genesis" block to the most recently completed block.

In addition to being decentralized and collaborative, the information recorded to the blockchain described herein may be "append-only", using cryptographic techniques that guarantee through consensus algorithms that once a transaction has been added to the ledger it cannot be modified. This property of "immutability" makes it simple to determine the provenance of information because participants can be sure information has not been changed after the fact. Consensus algorithms are designed to achieve reliability in a network involving one or more multiple unreliable nodes. Solving that issue—known as the consensus problem—is important in distributed computing and multi-agent systems. A consensus algorithm is a process in computer science used to achieve agreement on a single data value among distributed processes or systems. As described further herein, each transaction to be recorded to a blockchain may be validated and authenticated by the nodes of the network (e.g., multiple nodes 10) via a process called consensus. Consensus serves to confirm the correctness of all transactions in a proposed block (according to endorsement and consensus policies/protocols) and ensure the network participants or nodes agree on order and correctness (which implies an agreement among the nodes on a global state).

In various implementations, the systems, methods, and non-transitory computer readable media described herein are configured to implement a blockchain-based tokenized shared appreciate note system (e.g., tokenized shared appreciate note system 120) via a decentralized application on a virtual machine. In some implementations, the systems, methods, and non-transitory computer readable media described herein are configured to implement a blockchain-based tokenized shared appreciate note system (e.g., tokenized shared appreciate note system 120) via a distributing computing system running one or more virtual machines programed to implement smart contracts, such as the Ethereum Virtual Machine (EVM). The system may include one or more decentralized applications (or "dApps"), configured to implement some or all of the functions described herein. The dApp and the smart contracts may be implemented on the EVM and/or on a web3 decentralized internet system.

Blockchain technology can provide a technical solution with increased security and transactional efficiencies while reducing counterparty risk, the need for trust, compliance, and auditing costs. The blockchain network may include many nodes. A blockchain may comprise software that runs on a computer operating as a node 10. Each node may be connected to the blockchain network and can submit and receive transactions. Each node participating in the network may have its own copy of the blockchain ledger, which can be synchronized with other nodes using a peer-to-peer (or other) protocol. Each node may run the code to validate transactions and maintain the integrity of the blockchain.

Smart contracts are computer programs stored on a blockchain that facilitate, verify, or enforce the negotiation or performance of a contract, or that make a contractual clause unnecessary as contracts are automatically executed when pre-programmed conditions are satisfied. Smart contracts may also have a user interface and often emulate the logic of contractual clauses. Smart contracts eliminate ambiguity regarding the terms of agreements and reduce the reliance on external dependencies. Smart contract code may be written in Solidity or other language for use with a virtual machine, such as the Ethereum Virtual Machine. This code may be stored and executed on the blockchain. However, various alternatives to smart contracts as described herein may be used. Instead of smart contracts, chaincode may be used with the Hyperledger fabric. One or more smart contracts may be configured to implement the functionality described herein.

In various implementations, one or more smart contracts may be configured to depend on various conditions (e.g., an approval in the form of digital input from a third party at a given date or time). To enhance the integrity of the system, an agreed-upon outside system or service, known as an "oracles," can be used to monitor and verify such conditions, data, and/or other events. The oracle may be an agreed to off-chain service (not part of the blockchain) that may send information to the one or more smart contracts. In some implementations, the oracle may be a group of individuals who are granted permissions to provide input, approval, information, or to monitor one or more smart contracts operating on the blockchain.

To develop a smart contract, parts of the terms that make up a traditional contract are implemented in software code and uploaded to the blockchain, producing a decentralized smart contract that does not rely on a third party for recordkeeping or enforcement. For example, smart contracts can initiate operations by triggering data reads and data writes that are executed by one or more nodes on the blockchain. Contractual clauses stored as data in a smart contract are automatically executed when pre-programed conditions are satisfied, such as when input is received from an authenticated user or when mathematical conditions defined by the smart contract code have been satisfied (i.e., a certain period of time has elapsed). This eliminates ambiguity regarding the terms of the agreement and disagreement concerning the existence of external dependencies.

Smart contracts can be thought of as computerized transaction protocols that execute terms of a contract. In the case of purchase agreement, smart contracts are essentially self-executing contracts with the terms of the agreement between buyer and seller being directly written into and executed by lines of code. The code and the agreements contained therein can exist across a distributed, decentralized blockchain network. Using a scripting language or other techniques, a smart contract can include logic-based programs run on top of a blockchain. One or more of the features described herein may be executed based on blockchain-based smart contracts stored in a smart contract repository. More complex commercial agreements are possible through use of smart contracts, including for example, the tokenization, distribution, and allocation of equity and debt through smart contract-based agreements.

While various embodiments described herein reference a blockchain, other distributed ledgers can be used. According to some implementations, transactions between users or counterparties may be broadcast across the network, verified by one or more consensus or other algorithms and grouped together into blocks. Users may submit transactions or other data pertaining to one or more smart contracts using a client. This may be in the form of a cryptographic wallet or otherwise. As mentioned elsewhere herein, MetaMask or other dApp browser bridges may be used by one or more users or administrators of the system to access the functionality or features of one or more smart contracts that are operating on a blockchain.

Smart contracts can be thought of as computerized transaction protocols that execute terms of a contract. Smart contracts are essentially self-executing contracts with the terms of the agreement between parties being directly written into and executed by lines of code. The code and the agreements contained therein can exist across a distributed, decentralized blockchain network. Using a scripting language or other techniques, a smart contract can include logic-based programs run on top of a blockchain. One or more of the features described herein may be executed based on blockchain-based smart contracts stored in a smart contract repository.

Figure 2:
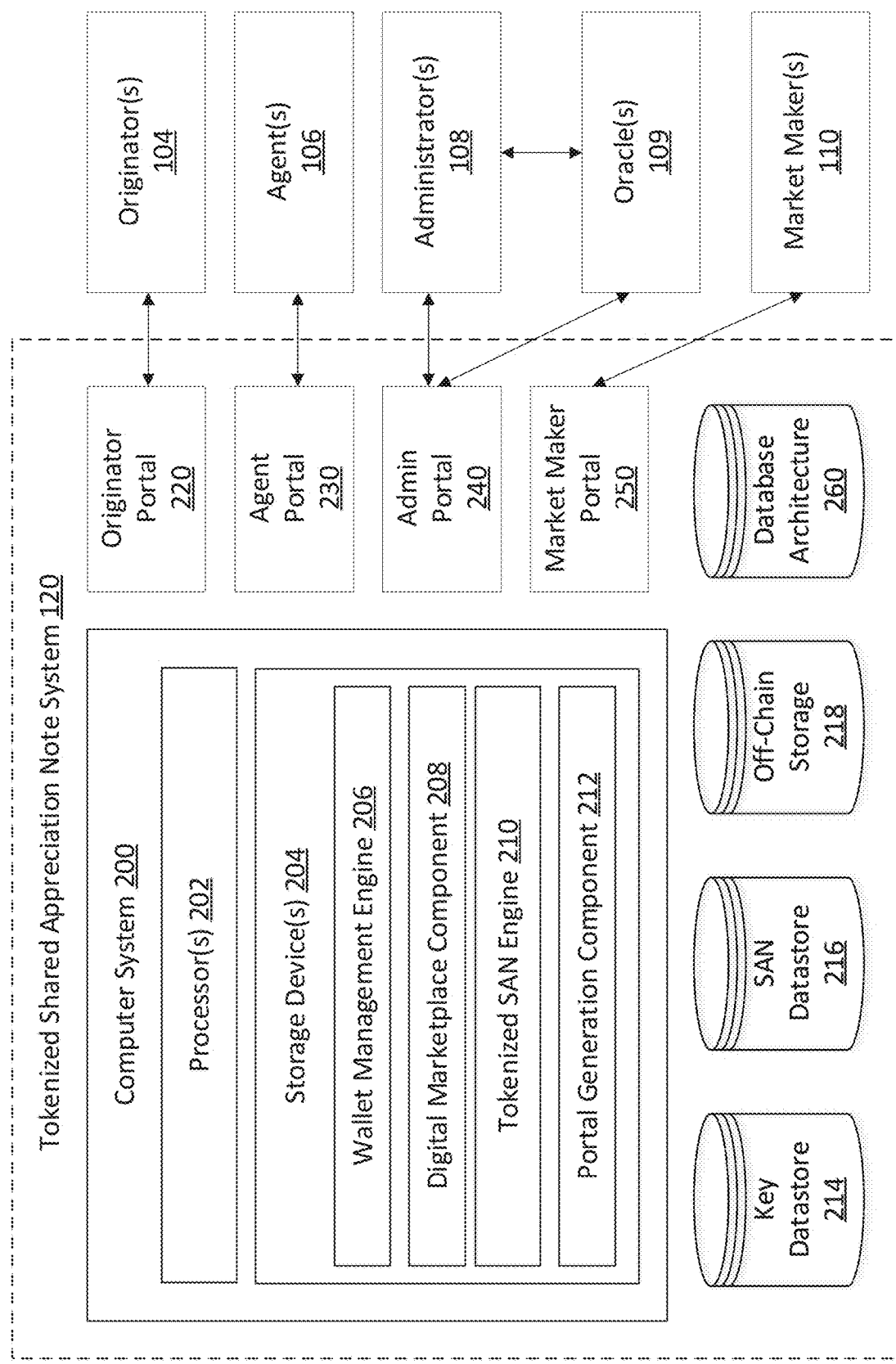
FIG. 2 illustrates a diagram of the tokenized shared appreciation note system in accordance with the embodiments disclosed herein.

FIG. 2 illustrates a block diagram of an example of a tokenized SAN system 120, in accordance with one or more implementations of the invention. Tokenized SAN 120 may include a computer system 200 and one or more portals generated by computer system 200. The one or more portals generated by computer system 200 may include an originator portal 220, an agent portal 230, an admin portal 240, a market maker portal 250, and/or one or more additional portals. As described further herein, the one or more portals generated by computer system 200 may be configured to interface with one or more users and/or administrators of tokenized SAN system 120. For example, the one or more portals may be specifically configured to interface with one or more one or more originators 104, administrators 106, agents 108, market makers 110, and/or the one or more additional third parties connected to tokenized shared appreciate note system via network 102. In some cases, the portals may be the same portal, but may provide different features to each of the users based on their respective permissions.

Computer system 200 may be configured as one or more computers or processing devices. Computer system 200 may further be configured as a blockchain- and/or cloud-based system. Computer system 200 may include one or more physical processors 202, one or more storage devices 204, and/or other components. Processor(s) 202 may be configured to provide information processing capabilities in computer system 200. As such, processor(s) 202 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Operating as a cloud-based system, one or more processors 202 of computer system 200 may be included in a plurality of server platforms and may cooperate to perform the functions that implement and/or instantiate computer system 200. Similarly, one or more storage devices of computer system 200 (e.g., one or more storage devices 204) may be distributed across multiple physical platforms, and cooperate to provide the required storage space. Computer system 200 may therefore operate as a virtualized system.

Processor(s) 202 may be programmed by one or more computer program instructions stored in one or more storage devices 204. For example, processor(s) 202 may be programmed by a wallet management engine 206, a digital marketplace component 208, a tokenized SAN engine 210, a portal generation component 212, and/or other instructions that program computer system 200 to perform various operations, each of which are described in greater detail herein. Wallet management engine 206 may be configured to generate and manage digital wallets configured specifically for homeowners, loan originators, closing agents, escrow agents, administrators, oracles, market makers, and others for facilitating the representation of ownership of one or more, or a portion of, a tokenized SAN as described further herein.

Digital marketplace component 208 may be configured to generate and maintain a digital marketplace through which a user may purchase, sell, transfer, and exchange tokens linked to a digital wallet for one or more tokenized SANs, as described further herein. Tokenized SAN engine 210 may be configured to facilitate the provision of shared appreciation notes through the acquisition, creation, approval, auditing, exchange, tokenization, and minting of tokenized shared appreciation notes or other debt instruments, as described further herein. Portal generation component 212 may be configured to generate and provide portals for accessing a tokenized SAN system, as described further herein. For example, portal generation component 212 may be configured to generate and provide an originator portal 220 for interfacing with one or more originators 104 and one or more homeowners operating through one or more loan originators 104, an agent portal 230 for interfacing with one or agents 106, including escrow agents and/or closing agents, an admin portal 240 for interfacing with one or more administrators 108, which may include one or more oracles 109, a market maker portal 250 for interfacing with one or more market makers 110, which may include investors and/or traders, and/or one or more other portals. As used herein, for convenience, various instructions will be described as performing an operation, when, in fact, the various instructions program the one or more processors 202 (and therefore computer system 200) to perform the operation.

In various implementations, various features described herein as being performed by wallet management engine 206, digital marketplace component 208, tokenized SAN engine 210, and/or portal generation component 212 may be performed via computer code, which may comprise one or more blockchain-based smart contracts or not.

Wallet management engine 206 may be configured to generate and manage digital wallets configured specifically for homeowners, loan originators, escrow agents, closing agents, oracles, administrators and/or other users of tokenized SAN system 120. In various implementations, wallet management engine 206 may be configured to generate and manage digital wallets configured specifically for market makers, through which originators may acquire a token representing ownership of tokenized SAN. Wallets may have unique public facing addresses that are only accessible by the user with a corresponding private key. In some cases, users may provide authentication to various transactions through their wallet. In such cases, a user may provide a digital authentication that is recorded on the blockchain network by using their private key.

Digital marketplace component 208 may be configured to generate and maintain a digital marketplace through which a user, or a market maker, may purchase tokens linked to a digital wallet for one or more tokenized SANs. A market maker may send money using digital marketplace component 208 electronically using traditional bank payment methods, including wire transfers or deposits, or through a cryptographic payment in order to receive one or more tokens representing ownership in a tokenized SAN. In implementations, a market maker, or purchaser, may send funds or digital currency as input or a confirmation that is recorded on the blockchain network. Each tokenized SAN may comprise a non-fungible crypto token compliant with the ERC20 token standard.

In various implementations, digital marketplace component 208 may be configured to generate and maintain a digital marketplace based on information stored in a SAN datastore 216. Information stored in SAN datastore 216 may include pre-defined SAN information comprising data structures that define parameters relating to SAN agreements. In implementations, SAN datastore 216 may comprise an associated list of identified loan originators, homeowners, market makers, and agents that participate in the tokenized SAN system 120, according to the parameters. In implementations, SAN datastore 216 may comprise one or more credentials for one or more of the loan originators, homeowners, market makers, and agents. For example, SAN datastore 216 may comprise a license number or digital certificate for loan originator in the tokenized SAN system 120, thus demonstrating to other actors participating in the tokenized SAN system that the loan originator is licensed as a lender or a broker. For example, a NMLS or CA BRE license number may be stored in SAN datastore 216 in association with an identified party. Similarly, market makers 110 may have an associated credential demonstration their license to invest. In various embodiments, the SAN datastore 216 may comprise numerous types of identification or credential information associated with the one or more participants of tokenized SAN system 120.

In implementations, the SAN datastore 216 may comprise information relating to a loan backed by an asset including, but not limited to, the value of the loan, various physical or digital loan-related documents, asset appraisal information, public records relating to the ownership of an asset, party and counter party identification, title information, or information pertaining to the nature of the asset, as disclosed further herein.

In certain implementations, the SAN Datastore 216 may comprise information relating to the identities and respective permissions of the one or more participants of the tokenized SAN system 120. In implementations, SAN Datastore 216 may identify who is verified to submit a loan application to one or more of the administrators or oracles participating in tokenized SAN system 120. In embodiments, the SAN Datastore 216 comprises identification and permission information of one or more of the agents, administrators, market makers, originators, and homeowners, according to the respective functions defined herein. Various permissions may be defined and associated with the specific identification of the participants of tokenized SAN system 120. In embodiments, the SAN Datastore 216 comprises all information described herein that is used by one or more smart contracts, including identification of the various smart contracts created and operated by tokenized SAN system 120.

In various implementations, digital marketplace component 208 may be configured to cause a digital marketplace user interface to be presented to the user through which a user can search for, select, purchase, and/or transfer one or more tokens associated with a tokenized SAN. In various implementations, digital marketplace component 208 may be configured to generate and maintain a digital marketplace accessible via a web-based interface, a mobile application, and/or one or more other applications or interfaces configured to receive user input related to tokenized SAN system 120. In various implementations, digital marketplace component 208 may be configured to generate and maintain a digital marketplace accessible via a digital wallet (or digital wallet application). In some implementations, digital marketplace component 208 may be configured to generate and maintain a digital marketplace that is integrated within a digital wallet (or digital wallet application).

Tokenized SAN engine 210 may be configured to facilitate the creation and approval of tokenized SANs. In some implementations, tokenized SAN engine 210 may be configured to facilitate the creation of a tokenized SAN smart contract based on a loan agreement provided by an originator to one or more administrators. In various implementations, tokenized SAN engine 210 may be configured to enable an originator to submit loan proposals directly or via one or more other users and/or third parties. In some implementations, tokenized SAN engine 210 may be configured to identify one or more originators which one or more tokenized SAN smart contracts are associated with. In implementations, a tokenized SAN smart contract may govern a transaction between a market maker, one or more administrators, and an originator, and may include all information pertaining to a loan origination, including: a loan amount (in USD), an appraised asset value, wherein the asset is collateral to the loan and verified by one or more oracles, a combined loan-to-value, a zip code corresponding to the asset, a unique smart contract identification, the identification of all parties participating in the transaction, the market value of tokens created by the tokenized SAN system 120, and the number of tokens created by the tokenized SAN system 120. In implementations, tokenized SAN processing engine comprises one or more interrelated smart contracts that define the relationships and operation of the one or more participants of tokenzied SAN system. Portal generation component 212 may be configured to generate and provide portals 220, 230, 240, 250, and other portals for accessing tokenized SAN system 120. Each portal generated by portal generation component 212 may be provided via a user display of a user device associated with participants of tokenized SAN system 120.

Originator portal 220 may comprise a user interface presented to one or more originators 104 (or homeowners associated with one or more originators 104). In various implementations, originator portal 220 may comprise a digital wallet application. In various implementations, originator portal 220 may comprise a user interface having a first portion configured to enable the user to manage and upload documents relating to an originated loan that the originator wishes to be tokenized by tokenized SAN system 120. In embodiments, originator portal may be accessed by one or more homeowners who are associated with the one or more originators 104.

Agent portal 230 may comprise a user interface presented to one or more agents 106. In various implementations, agent portal 230 may comprise a digital wallet application of a closing agent as described herein. In various implementations, agent portal 230 may be configured to receive registration information by which an agent may be registered with tokenized SAN system 120. For example, agent portal 230 may be configured to generate and a display interface, which may be configured to enable a service provider to register with tokenized SAN system 120. In various implementations, agent portal 230 may comprise a user interface through which agents 106 may access loan information corresponding to loans submitted by one or more originators 220. In implementations, agent portal 230 may provide an interactive mechanism for agents 106 to manage an escrow account relating to a transaction between the market makers 110 and the originators 104. In implementations, agents 106 may use agent portal 230 to verify loan documents on the blockchain, which is registered as input by one or more smart contracts contained within tokenized SAN system 120.

Admin portal 250 may comprise a user interface presented to one or more administrators 108. In various implementations, admin portal 240 may comprise a user interface through which administrators of tokenized SAN system 120 may view, inspect, and verify loan documents and information submitted by originators. In some implementations, admin portal 240 may be configured to enable one or more oracles 109 to view, inspect, and verify loan documents and information submitted by originators. In implementations, admin portal 240 may be configured to enable one or more oracles 109 to provide authorization on the blockchain of a loan application submitted by one or more originators 104.

Market maker portal 250 may comprise a user interface presented to one or more market makers 110. In various implementations, market maker portal 250 may comprise a user interface through which one or more users with access may securely view and purchase cryptographically secured tokens representing ownership in one or more shared appreciation notes submitted by an originator.

In some implementations, storage devices of tokenized SAN system 120 may include a key datastore 214, off-chain storage 218, a database architecture 260, and/or one or more other electronic storage components. Key datastore 214 may be configured to store and manage public keys and private keys for digital wallets and access permissions of tokenized SAN system 120. For example, key datastore 214 may be configured to store, for each digital wallet of tokenized SAN system 120, a public key, a corresponding private key, and an indication of the association between the public key and the corresponding private key. Each key may comprise a long string of numbers and/or letters. In some implementations, public keys and private keys may comprise long strings of numbers and/or letters linked through a cryptographic algorithm that was used to create the keys. A public key may comprise an address and may be comparable to a bank account number which may be published to the world and to which others may send currency, tokens, information, permissions, and/or other items of value or access which may be stored in, or associated with a user via, the user's wallet or more generally, associated with the user itself. Private keys are meant to be guarded secrets comparable to an ATM pin. In other words, a private key may be held in secret by each wallet (or user associated with a wallet), while the public key may be publicly available and used to identify the corresponding wallet. In some implementations, public keys may be administered via a public key infrastructure (PKI) comprising a set of roles, policies, and procedures needed to create, manage, distribute, use, store, and revoke digital certificates and manage public-key encryption.

Database architecture 260 may comprise a set of databases configured to store information and/or indications of transactions required to securely manage the creation, acquisition, allocation, minting, transfer and redemption of tokenized SANs via a blockchain-based tokenized SAN system 120.

The tokenized SAN system 120 may be securely managed using a cryptographically secured distributed ledger system. In various implementations, transactions (and other information) may be written as blocks to a distributed, decentralized ledger. In some implementations, various data and transaction information may be written to and stored via a distributed ledger and other data and/or transaction information may be processed and/or stored off-chain (e.g., in traditional databases). In various implementations, information, including transaction information and virtual machine state information, may be stored in one or more databases may be recorded on a blockchain and information stored in one or more other databases may be recorded off the blockchain.

Transactions to be recorded to the blockchain are distributed amongst nodes on a network. The nodes then validate and authenticate each transaction via a process called consensus. In various implementations, the consensus algorithm used may require the network participants (e.g., multiple nodes 10) to provide a guaranteed ordering of the transaction and validate the block of transactions that need to be committed to the ledger. Only valid transactions are both recorded to the blockchain and reflected on a public ledger. When recorded to the blockchain, the various details of the transaction are recorded on a "block" are dispersed to the entire blockchain network, which makes it irreversible.

On-chain transactions generally take longer to process than off-chain transaction as a result of the additional steps that must occur (e.g., validating, authentication, and/or one or more other steps) for the transaction to be successfully completed and recorded. Additionally, the potentially high cost of a transaction on a public network can prove off-putting for some members of the community. Off-chain transactions, on the other hand deal with values that are outside the blockchain, do not need to be on the blockchain or should not be, and can be carried out using a number of methods. For example, two parties can have a transfer agreement, then there can be a third party who guarantees that the transaction is correct (such as an internal verification process). Off-chain, one or more nodes may determine they would rather not implement various changes, and this could have an effect on the rest of the community if it were on the blockchain. Any transaction which is conducted off-chain may be instantaneous, may not have accompanying transaction fees, and may offer a different degree of security. However, off-chain transactions may not be irreversible as they do not occur on the blockchain.

Figure 3:
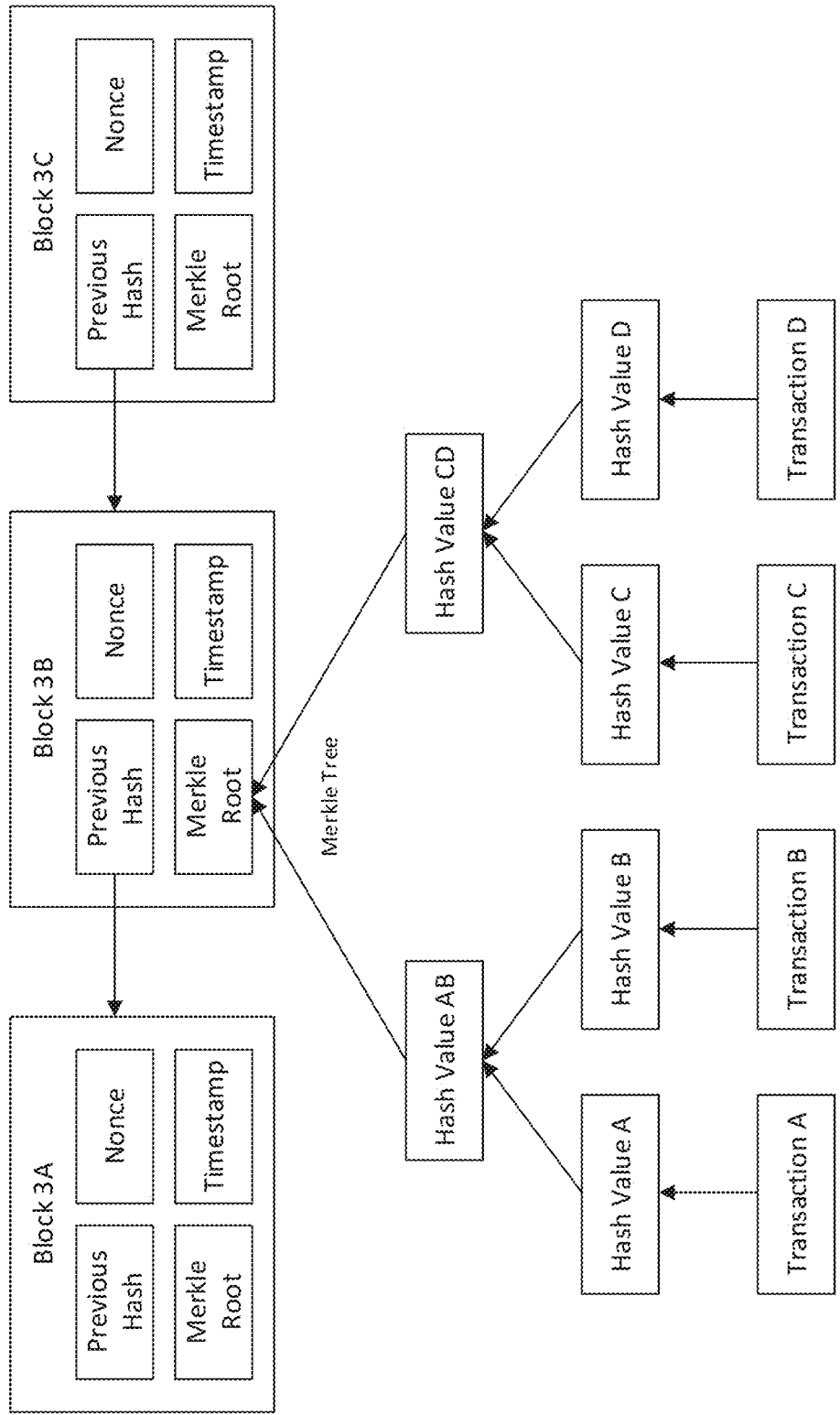
FIG. 3 illustrates a blockchain diagram according to the embodiments disclosed herein.

FIG. 3 illustrates a block diagram of an example of blocks on a blockchain, in accordance with one or more implementations of the invention. For example, the blocks of the blockchain depicted in FIG. 3 may comprise blocks 3 (e.g., block 3A, block 3B, block 3C, and/or one or more additional blocks) of decentralized ledger. Each block may include the hash of the previous block's header, thus forming the "chain" of blocks—or blockchain. For example, block 3C may include the hash of block 3B, and block 3B may include the hash of block 3A. If a previously published block were changed, it would have a different hash. This in turn would cause all subsequent blocks to also have different hashes since they include the hash of the previous block. This makes it possible to easily detect and reject any changes to previously published blocks. If there is not agreement (consensus) of the transactions then the new block of information is not committed to the blockchain. As described herein, the distributed ledger comprising the blocks of a blockchain depicted in FIG. 3 may be shared by the nodes on a network (e.g., by multiple nodes 10 of blockchain network 1). Transactions that may be stored and shared by the nodes are not limited to financial transactions, but also include complex applications involving interrelated smart contract such as tokenized SAN system 120.

Figure 4:
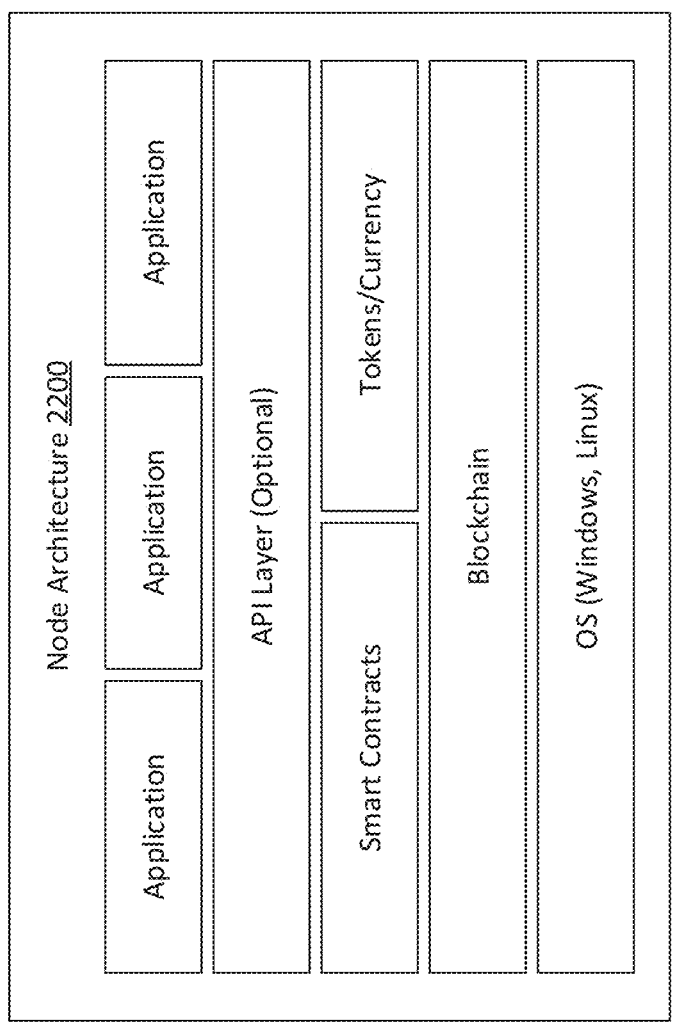
FIG. 4 illustrates the architecture of a node in accordance with the embodiments disclosed herein.

FIG. 4 illustrates a block diagram of an example of a node architecture 2200 for each of the nodes of the blockchain network, in accordance with one or more implementations of the invention. In various implementations, each of multiple nodes 10 of blockchain network 1 may comprise node architecture 2200. To facilitate tokenized SAN system 120, each of the multiple nodes 10 of blockchain network 1 may install and run a computer application specific to the ecosystem in which it participates. In an example implementation in which system 100 (and/or multiple nodes 10) are running Ethereum clients, one or more of multiple nodes 10 may each be configured to run geth on an Ubuntu server. In an example implementation in which system 100 (and/or multiple nodes 10) are operating in a Hyperledger environment, one or more of multiple nodes 10 may each be configured to connect to a Hyperledger Fabric Channel. A Hyperledger Fabric Channel may comprise a private subnet of communication between two or more specific network members for the purpose of conducting private and confidential transactions. A channel may be defined by members, anchor peers per member, the distributed ledger, one or more smart contract (or chaincode) applications, and one or more ordering service nodes. Each transaction on the network may be executed on a channel, where each party must be authenticated and authorized to transact on that channel. Each peer that joins a channel may have its own identity given by a membership services provider (MSP), which authenticates each peer to its channel peers and services.

In various implementations, a consensus algorithm may be implemented as part of a node application to verify that there is agreement between nodes regarding modifications made to a distributed ledger. The consensus algorithm (or consensus decision technique) implemented may comprise a protocol (or set of rules) used to ensure the accuracy and trustworthiness of the nodes on the network and the information to be recorded to the distributed ledger. The method for reaching a consensus and determining the global state may utilize one or more different schemes. In some implementations, the number, percentage, and/or other metric used to determine whether a consensus has been achieved may be predefined or set according to particular needs. In some implementations, the consensus decision technique used may be based on a consensus framework with predefined methods or algorithms. For example, proof-of-work (PoW), proof-of-stake (PoS), Proof of Elapsed Time (PoET), and/or other consensus algorithms may be used. In various implementations, a virtual machine may be implemented as part of the node application.

Figure 5:
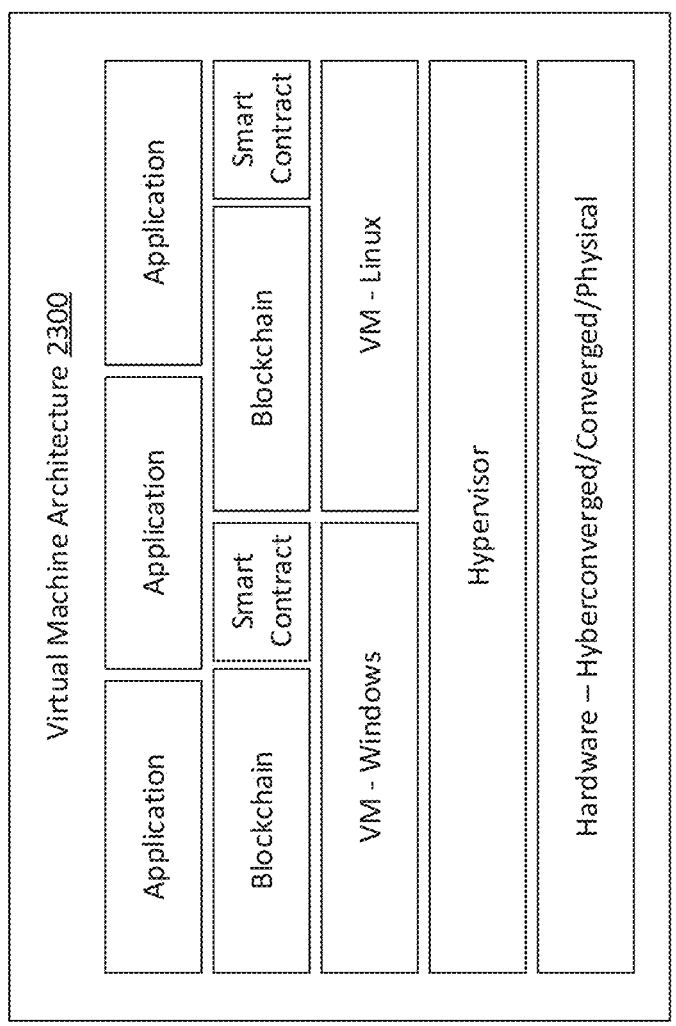
FIG. 5 illustrates the architecture of a virtual machine in accordance with the embodiments disclosed herein.

For example, FIG. 5 illustrates a block diagram of an example of a virtual machine architecture 2300 run on each of the nodes of the blockchain network, in accordance with one or more implementations of the invention. As would be appreciate by one of ordinary skill in the art, virtual machines, such as the Ethereum Virtual Machine, permit applications and programs implementing smart contracts to run on a blockchain network. In embodiments, Virtual Machine architecture may comprise one or more applications implementing smart contracts on a blockchain network. In implementation, a hypervisor or virtual machine monitor (VMM) may be implemented to create and run a virtual machine on the blockchain network. In accordance with the embodiments disclosed herein, the functions and operations described may be performed on a virtual machine running on a blockchain network.

Figure 6:
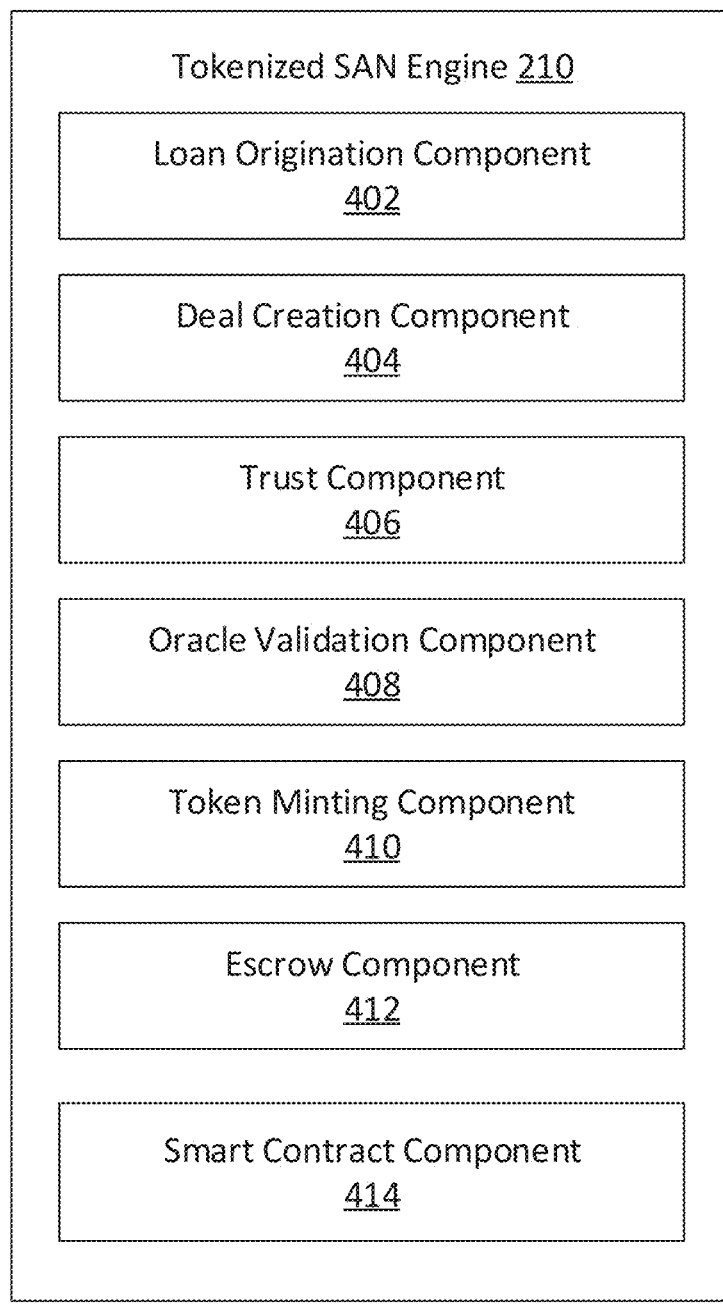
FIG. 6 illustrates a block diagram of a tokenized SAN engine and corresponding tokens as disclosed herein.

FIG. 6 illustrates a block diagram of an example tokenized SAN engine 210 in accordance with the present disclosure. In some embodiments, tokenzied SAN engine 210 may comprise a loan origination component 402. Loan origination component 402 may be accessed, controlled, initiated, or otherwise involved with one or more homeowners seeking financing and one or more originators 104 through whom the one or more homeowners seek a loan or other debt instrument. In embodiments, loan origination component 402 may contain an originator portal 220 through which originators 104 may submit one or more applications to one or more administrators corresponding to a loan, or other debt instrument, sought by a homeowner. In embodiments, originator 104 accesses originator portal by using credentials that identify and authenticate the identity of originator 104, including a password, biometric identification, or another suitable form of identification for accessing originator portal 220. In embodiments, originator identifications correspond to a wallet address, or more broadly, any address or identification that is recognized by one or more nodes on the blockchain as being a participant of the tokenized SAN system 120.

In embodiments, the application submitted by originator 104 may include a loan, or other debt instrument that is backed by asset. In other words, there is a tangible or intangible asset that forms collateral to a loan that is sought by homeowner, or any other individual seeking to obtain a loan from originator 104. In some embodiments, the application submitted by originator 104 corresponds to a shared appreciation note (SAN). With a SAN, the homeowner may commit, for example, a percent of their home's eventual sale price, instead of paying an interest rate. The homeowner owes no interest and makes no payments during the term of the loan. When the homeowner sells or refinances the home, the amount due is calculated based on their new home value. The lender's share of the home's appreciation is equal to the principal value of the original loan divided by the agreed-upon starting value of the home. In this way, the interests of the lender and homeowner are aligned. If the home increases in value, the homeowner owes the loan principal, plus a percentage of their home's appreciation. If the home loses value, the homeowner repays only the principal, meaning they received an effectively interest free loan. In this way, the SAN stands in as a type of preferred equity in the home. In various embodiments described herein, the application submitted by originator 104 initiates an interrelated smart contract process for obtaining a tokenized shared appreciation note (SAN).

In implementations, loan origination component 402 may comprise an originator portal 220 for submitting documents corresponding to a shared appreciation note. In embodiments, documents may include loan agreements, signed loan agreements, a title report, title, deeds, insurance contracts, and appraisals of an asset that acts as collateral to a loan. In embodiments, documents may be submitted to originator portal 220 in the form of PDFs, word documents, or other document formats that are readable and understandable to human beings. In other embodiments, information corresponding contained within the documents may be inputted into to originator portal 220. In other embodiments, information corresponding to loan documents contained within the documents may be received by tokenized SAN engine 210 as one or more smart contracts between an originator 104 and an individual or entity seeking a loan through originator.

In embodiments, loan origination component may permit an originator 104 to submit information pertaining to a loan amount an appraised asset value, wherein the asset is collateral to the loan and verified by one or more oracles, a combined loan-to-value, a zip code corresponding to the asset, a unique smart contract identification, the identification of all parties participating in the transaction, and the total value of qualified assets. In implementations, qualified assets may comprise all promissory notes for loans made or purchased by the trust component 406 as described herein, plus all cash received from the repayment of those loans, including principal, interest earned through appreciation or default, fees, and any surrendered collateral.

In some embodiments, tokenzied SAN engine 210 may comprise a deal creation component 404. Deal creation component 404 may be a program, script of code, or a component configured to create a smart contract on the blockchain network based on information pertaining to a loan agreement submitted by one or more originators 104 on originator portal 220. In embodiments, deal creation component 404 may receive information through an application programming interface (API) in order to populate fields require to create a smart contract agreement. In embodiments, deal creation component 404 may be configured to receive confirmation, authentication, and/or verification from one or more parties to the smart contract agreement that the contract is accurate, or otherwise acceptable and agreed to by the one or more parties to the smart contract agreement. In implementations, deal creation component 404 may contain a deal contract template that defines the format of originations and corresponding smart contracts. In implementations, deal creation component 404 creates a new deal smart contract for every origination and assigns a unique identification for each smart contract that is uniquely recognized by participants of the tokenzied SAN system 120. In implementations, deal creation component 404 may only be called by or initiated by one or more administrators 108.

In implementations, deal creation component 404 may record a deal, and all underlying information and/or documents corresponding to a deal, on a SAN data store 216, a storage smart contract, or off-chain storage 218, in order to create registry of valid deals that have been accepted by one or more administrators 108. In some implementations, deal creation component may divide the storage of a smart contract deal and corresponding documents or information between offline and online storage, between off-chain and off-chain storage. As used herein, the phrase "on-chain" refers to information or an action that may be stored on, verified on, accessible by, or inspectable by, or performed by one or more participants of one or more blockchains. As used herein, the phrase "off-chain" refers to information or an action that is not necessarily stored on, verified on, accessible by, performed on, or inspectable by one or more participants of one or more blockchains.

In some embodiments, tokenzied SAN engine 210 may comprise a trust component 404. In implementations, the trust component may be identified as a party in every smart contract deal created by deal creation component. In implementations, trust component 406 may comprise an on-chain address that is recognized by one or more smart contracts or participants in tokenized SAN system 120. In implementations, the trust component's 406 private key may be required to approve a deal, a smart contract deal, or any other agreement related to an information received by loan origination component. In implementations, trust component 406 may be controlled one or more administrators 108, market makers 110, or agents 108. That is, on-chain approval of one or more of the administrators 108 controlling trust component 406 may be required in order for the private key of the trust component 406 to be used to approve of a smart contract. In implementations, and as one of ordinary skill in the art would recognize, actions of trust component 406 may be constrained to require certain on-chain conditions, such as the a majority on-chain vote, a unanimous on-chain vote, or another voting requirements, whether on-chain or off-chain on behalf of one or more administrators 108 controlling trust component 406. In embodiments, trust component 406 may operate as an independent mutual benefit trust that is controlled through smart contract code to operate purely for the benefit of token holders. In implementations, trust component 406 may be defined through smart contract code as the beneficiary of a SAN that is executed and tokenized by tokenized SAN system 120. In implementations, the trust component's 406 private key may be required for the trust component 306 to take any on-chain action, including burning tokens as disclosed below.

In implementations, trust component 406 may have exclusive access to oracle validation component 408. In implementations, trust component 406 access information pertaining to deals and agreements submitted by originator 220 through an admin portal 240. In implementations, trust component 406 may underwrite and approve new originations and loan documents first through an admin portal 240.

In implementations, trust component 406 may initiation on-chain transactions to purchase one or more tokens. In various embodiments, tokenized SAN engine 210 may be configured to retire tokens that have been purchased by trust component 406 to be immutably transferred to a wallet addresses or a smart contract which verifiably lock those tokens away from future transfer. In implementations, these "burn" addresses could be unowned wallets (e.g., a the 0x0 address) or a smart contract deployed specifically to interact with one or more administrators 108 or other applications or protocols to receive and burn tokens on behalf of the trust component 406. One of ordinary skill in the art would appreciate that these "burn" solutions may differ based on the context in which the buy-back purchases are made.

In implementations, tokenzied SAN engine 210 may comprise an oracle validation component 406. Oracle validation component 408 may comprise a smart contract that is controlled by, modifiable by, or under the direction of trust component 406. In implementations, oracle validation component 408 may validate and/or approve proposed agreements that are under review by trust component 406. In implementations, trust component 406 may require an approval verification code from the oracle validation component 408 in order for trust component 406 to make any approvals or authorizations.

In implementations, oracle validation component 408 is configured to use algorithms to validate the value of an asset that forms collateral to a loan, or other agreement including a SAN, submitted through loan origination component 402. In embodiments, oracle validation component may ensure that an asset value is greater than a low value and less than a high value determined by oracle validation component 408. In embodiments, oracle validation component 408 may determine and verify an asset value by using various on-chain and off-chain indexes, such as Zillow's ZHVI, county records offices, online postings, or other sources. In embodiments, oracle validation component 408 may determine and verify an asset value by using information submitted through loan origination component 402, including zipcode. In embodiments, oracle validation component 408 comprises an API that is configured to retrieve information from internet sources pertaining to the value of an asset.

In implementations, oracle validation component 408 is configured to submit an approval verification code to trust component 406 upon validating an asset value. In embodiments, validating an asset value comprises comparing a determined asset value to a corresponding asset value submitted through loan origination component 402. In various implementations, oracle validation component 408 is configured to operate as an autonomous verifier of submitted asset appraisals. In implementations, and by nature of the embodiments described herein, the oracle validation component 408 may determine and verify the total value of a deal, a smart contract deal, or an agreement.

In implementations, oracle validation component may determine the price of one or more tokens, as described herein, based on the market rate of the one or more tokens at any given time, or during a period of time. Oracle validation component 408 may determine the value of one or more tokens based on information made available on crypto token exchange platforms through an API. Oracle validation component may be configured to transmit a determine token value one or more other components as described herein.

Tokenized SAN engine may comprise a token minting component 410 configured to create one or more tokens upon authorization from one or more of the components as described herein. In embodiments, token minting component 410 may create one or more tokens using an ERC20-compliant smart contract code. In embodiments, minting component 410 may create one or more tokens that correspond to a smart contract deal approved or authorized by operation of one or more components of tokenzied SAN engine 210 as described herein. In implementations, token minting component 410 mints a number of tokens that is proportional to the value of the underlying deal, agreement, loan, or SAN. In implementations, token minting component 410 mints a number of tokens that is proportional to the value of qualified assets corresponding to a deal, agreement, loan, or SAN.

In implementations, token minting component 410 may be configured to receive a second value of one or more tokens as described herein. In implementations, token minting component 410 mints a number of tokens based on an updated minting rate that is base on the second value. This relationship may be built into the smart contracts which govern token minting component's operation. In various embodiments, token minting component validates that all minting requests correspond to valid deal identifications stored in one or more storage components or storage smart contracts as described herein.

Tokenized SAN engine may comprise an escrow component 410. Escrow component 410 may comprise a smart contract address that is designated to store funds that are to be submitted to one or more market makers 110 or administrators 108 as described herein. As set forth herein, a token may be restricted from sale due to certain regulation, including securities regulation, of concern to market makers and administrators 108. Escrow component 410 may be configured to ensure that a given set of token's restriction period is observed while maintaining the immutability of token offerings. In implementations, escrow component 410 may require input from one or more administrators 108 as described herein indicating that a token, or set of tokens, is authorized for distribution to defined addresses. In implementations, escrow component 410 may wait a predetermined period of time before distributing tokens to defined addresses. In implementations, escrow component 410 may comprise a smart contract or programmable digital wallet.

In certain implementations, tokenized SAN engine 210 may comprise a smart contract component 414. Smart contract component 414 may comprise one or more smart contracts that perform the functionalities of the one or more smart contract of tokenized SAN engine 210. Smart contract component 414 may enable the one or more components as described herein to submit authorizations or approvals, and transfer, store, or retire tokens or other cryptographic token or currency. In the various implementations described herein, the one or more smart contracts corresponding to smart contract component 414 may have an on-chain address associated with one or more users. In embodiments, actions taken by a smart contract may require the private key for the on-chain address.

Smart contract component 414 may be configured to interface with a blockchain network and decentralized ledger. In various implementations, smart contract component 414 may be configured to generate transactions to be transmitted to a blockchain network (e.g., blockchain network 1). In some implementations, smart contract component 414 may be configured to generate transactions for each interaction with a digital wallet facilitated by a wallet management engine. In various implementations, smart contract component 414 may be configured to write transactions, transfers, authorization, or any other action or digital state change occurring on tokenized SAN system 120 into a block on the decentralized ledger. In this manner, an immutable record of each interaction with tokenized SAN system 120 may be recorded in a decentralized ledger and available for inspection by one or more participants of tokenized SAN system 120, depending on their respective permissions.

Figure 7:
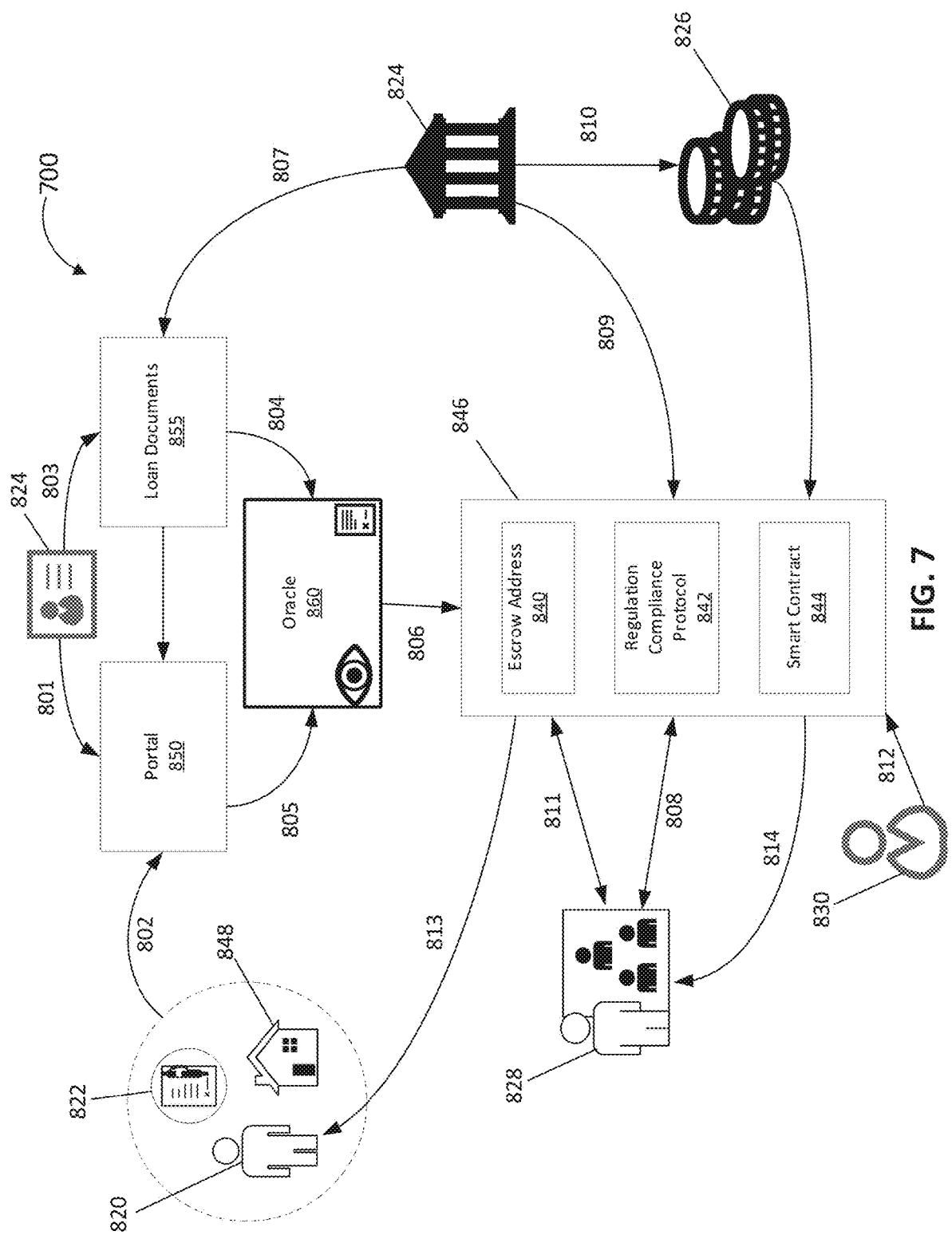
FIG. 7 illustrates a computerized system for securely generating and distributing cryptographically secure, digital tokens associated with a loan as disclosed herein.

FIG. 7 illustrates a diagram of an example of a method 700 configured to securely manage the tokenized SAN system 120. The various steps and processes described herein may be performed in various sequences and are not necessarily constrained to be performed in any particular order. In accordance with the various embodiments described herein, the various actors, participants, institutions, and entities participating in tokenized SAN system 120 may have one or more corresponding addresses or identifications associated with one or more blockchain networks utilized by tokenized SAN system 120. The various actors, participants, institutions, and entities described herein may interact with tokenized SAN system 120 by initiating digital inputs that are written or recorded to one or more blocks of the one or more blockchain networks utilized by tokenized SAN system 120. In implementations, initiating digital input may require a private key corresponding to an address that is under the control or direction by or more of the various participants of tokenzied SAN system 120. A digital authentication may be described as an instance where a party has provided confirmation by providing a private key. As detailed below, a given loan application may be involved in various transactions between the origination and eventual tokenization and distribution. In accordance with the disclosure below, metadata detailing each and every transaction involving an identified loan application may be stored in association with the identified loan application in the one or more data units, datastores, or modules, as described herein. In this fashion, a loan application may be thought of as a digital asset belonging to, involving, or otherwise influenced by certain participants of tokenzied SAN system 120.

At step 801, an originator interacts with portal 850 to access tokenized SAN system 120. Portal 850 may be similar to originator portal and other portals described herein. In embodiments, portal 850 may be configured to generate a display interface, which may be configured to enable originator 824 to register with tokenized SAN system 120. As mentioned elsewhere herein, MetaMask or other dApp browser bridges may be used by originator 824 to access the functionality or features of one or more smart contracts that are operating on the backend of tokenized SAN system 120.

Loan seeker 820, who owns or expects to own asset 848, may interact with portal 850 at step 802 in a similar manner as in step 801. In certain implementations, loan seeker 820 may be seeking a loan or other financial instrument through originator 824. In certain implementations, loan seeker 820 interacts with portal 850 for the purpose of obtaining a tokenized shared appreciation note. In various embodiments, asset 848 may be a house, or any other tangible or intangible asset of value. In step 802, interacting with portal 850 may comprise submitting agreement documents 822. Agreement documents 822 may contain information pertaining to a loan agreement between originator 824 and loan seeker 820. In implementations, agreement documents 822 may comprise physical documents represented in digital form. In other embodiments, agreement documents 822 may comprise digital information pertaining to a loan agreement that is uploaded by loan seeker 820 or originator 824 in steps 801 or 802. Information pertaining to a loan agreement may include the amount of financing sought by loan seeker 820, detailed identification and valuation information about asset 848, a representation of title to an asset, and party identifications. Through steps 801 and 802, originator 824 and loan seeker 820 upload information through portal 850 that will form the basis for the tokenized SAN agreement. At least a portion of the information submitted in through portal 850 be submitted as input or stored, in some form, to one or more blockchain networks utilized by tokenized SAN system 120. In other implementations, the loan seeker 820 submits documents offline directly to originator 824.

At step 803, originator 824 may upload supporting loan documents 855 to portal 850. Loan documents 855 may comprise documents submitted by loan seeker 820 in step 802. In some implementations, loan documents 855 may also include a qualified third-party appraisal and a preliminary title report. Originator 824 may have a valid lender/broker license that is recognized by tokenized SAN system 120. In certain implementations, originator 824 has privileged access to certain features of 850 accessible through an off-chain or on-chain password based on a previous registration validated by one or more administrators of system 700. In certain implementations, originator 824 begins an origination by uploading loan documents 855 to portal 850. An origination may receive an identification that is stored on-chain in association with all relevant parties, including the originator 824 and their corresponding credential.

At step 804, originator 824 submits a request for the oracle 860 to perform a validation of the value of asset 848 through an asset value determination as described herein with association with oracle validation component 408. At step 805, originator 824 may submit a loan application and corresponding loan documents 855 for final validation by the oracle 860. Oracle 860 may comprise a smart contract that is controlled by, modifiable by, or under the direction of a trust institution 824. Thus, oracle 860 may be configured to provide an on-chain validation of the value of asset 848, or an on-chain validation of the value of the loan agreement forming the basis of loan documents 855. In implementations, oracle may determine the maximum loan amount available to the loan seeker 820.

In step 806, oracle 860 may perform a validation the appraised value of asset 848. In implementations, oracle 860 may be configured to use one or more algorithms to validate the value of an asset 848 in step 806, or other agreement including a SAN, submitted through portal 850. In embodiments, the oracle validation may comprise ensuring that an asset value is greater than a low value and less than a high value determined by oracle 860. In embodiments, oracle 860 may determine and verify an asset value by using various on-chain and off-chain indexes, such as Zillow's ZHVI, county records offices, online postings, or other sources relating to the valuation of assets. In embodiments, oracle 860 may determine and verify an asset value by using information submitted through portal 850, including a zipcode. In embodiments, oracle 860 comprises an API that is configured to retrieve information from internet sources pertaining to the value of an asset. In implementations, oracle 860 may comprise a single smart contract that receives input at the direction a trust institution 824. Oracle 860 may by modifiable exclusively by a trust institution 824. In other implementations, oracle 860 may comprise a smart contract that receives input from and modifiable by a network of trust institutions similar to trust institution 824, or a network of individual participants. Oracle 860 may determine whether or not to accept the loan application.

In certain implementation, oracle 860 may signify its validation of a loan application through an on-chain verification. An on-chain validation may comprise assigning a loan application identification to the loan application in one or more storage units or components as described herein. In implementations, a validation of a loan application may be broadcast to one or more participants of tokenized SAN system 120. Validation of the application in step 806 may move the loan application into an escrow phase 846. Metadata relating to the oracle's 860 approval of the loan application may be stored in association with the loan application in one or more storage units as described herein.

In step 807, a trust institution 824 may review loan documents 855 using a portal and provide on-chain approval of the loan application to move into escrow phase 846. In certain implementations, the on-chain approval is not necessary for the loan application to move into the escrow phase 846. In embodiments, metadata relating to the trust institution 824 approval of the loan application may be stored in association with the loan application in one or more storage units as described herein. In implementations, the trust institution 824 may identify itself as a beneficiary to the loan underlying the loan application. The trust institution 824 may identify itself as a beneficiary with a digital wallet address or other on-chain digital identification recognized by one or more actors of tokenized SAN system 120. Trust institution 824 may be a mutual benefit trust comprising one or more persons that are tasked with facilitating the system 700.

In implementations, escrow phase 846 may comprise an escrow address 840, a regulation compliance protocol 842, and a smart contract component 844. Escrow address 840 may comprise one or more predefined digital wallet addresses. In some implementations, escrow address may comprise one or more digital wallet addresses that were created upon the loan application's approval to enter escrow phase 846.

In implementations regulation compliance protocol 842 may comprise a smart contract that requires one or more digital conditions to be met in order to guarantee compliance with one or more regulations. In some circumstances, a digital condition may comprise an on-chain indication from trust institution that regulatory criterion have been satisfied. In some implementations, the one or more digital conditions make require input and/or information from one or more market makers 828. For example, regulation compliance protocol 842 may require input corresponding to anti-money laundering (AML) and know your customer (KYC) information from market makers seeking to purchase or acquire one or more tokens representation ownership of a tokenized SAN as described herein. In implementations, regulation compliance protocol 842 may require that one or more market makers verify that they are an accredited investor as defined by securities regulation statutes, which may be verified and recorded on-chain. In certain implementations, regulation security protocol may require that tokens delivered to the escrow address be restricted from transfer for a predefined holding period. In various embodiments as described herein, regulation compliance protocol may require on-chain verification from one or more participants of the tokenzied SAN system 120 that a transfer of token complies with Regulation D of the Securities Exchange Act of 1933 and Section 25102(f) of the California Corporations Code. In implementations, this may comprise an on-chain verification that a threshold time period has elapsed since or more tokens have been transferred to an escrow account. In accordance with the disclosure set forth herein, regulation compliance protocol 842 serves to provide on-chain verification of compliance prior to any distribution of tokens.

In implementations, escrow phase 846 may a smart contract component 844. As set forth herein, the escrow phase 846 may require on-chain verification and authentication of certain conditions based on certain information for participants of tokenzied SAN system 120 and authorizations from oracle 860, market makers 828, and trust institution 824. In accordance with the disclosure set forth herein, smart contract component 844 may comprise one or more smart contracts configured to receive input on-chain and actuate the delivery of tokens to one or more market makers as set forth below.

In step 808, one or more market makers 828 may access a marketplace through a portal for one or more tokens corresponding to the loan application. Market makers 828 may interact with a portal similar to portal 850 to access the marketplace of tokenized SAN system 120. In embodiments, the portal may be configured to generate a display interface, which may be configured to enable market makers 828 to register with tokenized SAN system 120. As mentioned elsewhere herein, MetaMask or other dApp browser bridges may be used by market makers 828 to access the functionality or features of one or more smart contracts that are operating on the backend of tokenized SAN system 120. The one or more market makers 828 may initiate a purchase of one or more tokens. In certain embodiments, a market maker 828 indicate acceptance through digital input linked to an registered account belonging to a market maker 828. In certain implementations, a digital acceptance may comprise an on-chain digital acceptance. In other implementations, a digital acceptance may comprise the market maker 828 submitting all required verification and information to satisfy the requirements of the regulation compliance protocol. Step 808 may comprise the execution of an on-chain token purchase agreement in the form of a smart contract involving the escrow address and one or more digital wallets associated with one or more market makers that are parties to the token purchase agreement. The market makers 828 may indicate on-chain acceptance of the token purchase agreement by using their respective private keys.

In step 809, the trust institution 824 countersigns the token purchase agreement promising to mint new tokens 826 at the close of the primary loan transaction. In embodiments, the close of the primary loan transaction may include the originator 824 providing a loan to the loan seekers and indicating through portal 850, or by any other means, that the primary loan transaction has closed. In embodiments, the trust institution 824 may countersign the token purchase agreement on-chain by using its private key. In step 810, new tokens 826 corresponding to the loan application may be minted by a smart contract in accordance with the disclosure set forth herein. In implementations, the tokens 826 may be held in digital escrow address 840 until the escrow phase 846 is completed. In implementations, individual token 826 may contain information pertaining to the associated loan agreement, including party identification information and information pertaining to the identification of the underlying asset 848. In these implementations, tokens are unique in the sense that they are associated with specific parties and/or assets. In other implementations, token 826 do not contain any data related to the underlying loan application. In this sense, tokens 826 may be considered identical in the sense that each token represents a homogenous unit of value corresponding to equity in an asset.

In step 811, one or more market makers transmit funds, either in the form of fiat currency or digital currency, for the token purchase to a closing agent 830 in an amount equal to a loan to be funded. In various embodiments, a closing agent 830 may have permissioned access to the escrow address, or more broadly, permissioned access to initiate aspects of the escrow phase. Closing agents 830 may be registered with the tokenized SAN system 120 according the various registration methods described herein. Closing agents 830 may interact with the tokenized SAN system 120 through on or more portals, including agent portal 230.

In step 812, closing agent 830 reviews all loan and token issuance documents and provides on-chain confirmation to smart contract component 844 that it has received funds from the one or more market makers 828. In step 812, closing agent may also transmit funds to title to fund the loan on behalf of the trust institution 824.

In step 813, the loan corresponding to loan application may close at the direction and approval of originator 824. In implementations, the loan is recorded on-chain to title with the trust institution 824 identified on-chain as a beneficiary. In step 814, upon on-chain verification from the closing agent 812 and the regulation compliance protocol, smart contract component 844 transfers tokens 826 from escrow address 840 to one or market makers 828 that are identified in the escrow phase 846 as being entitled to the tokens 826.

Figure 8:
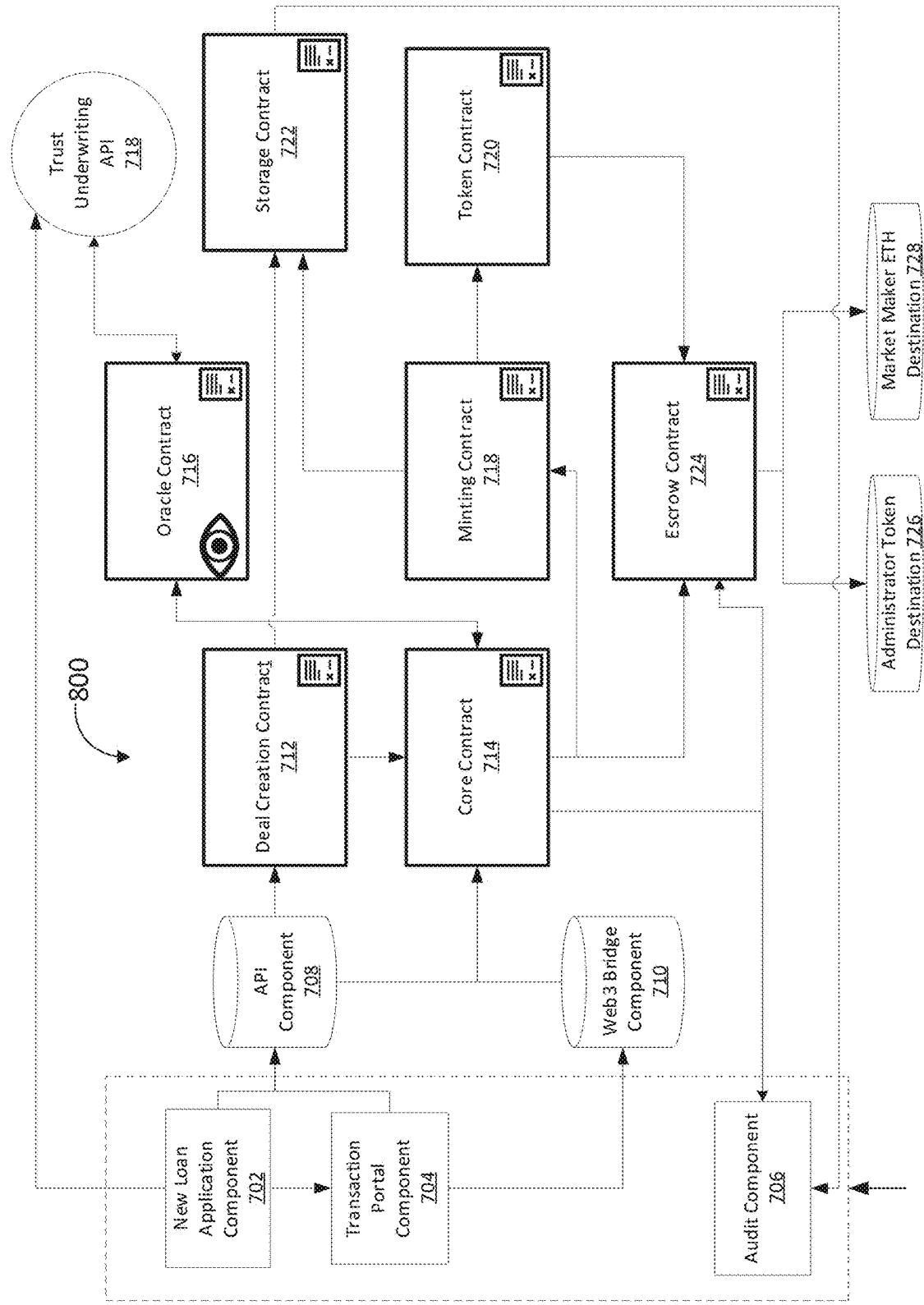
FIG. 8 illustrates a computerized system for securely generating and distributing cryptographically secure, digital tokens associated with a loan using smart contracts as disclosed herein.

FIG. 8 illustrates a system of smart contracts 800 for implementing a tokenized SAN system 120. The architecture of the system of smart contracts 800 may comprise one or more smart contracts which regulate, document and facilitate the creation and exchange of cryptographic tokens. The system of smart contracts 800 may comprise one or more blockchain networks that facilitate the storage and operation of the one or more smart contracts.

In embodiments, system 800 comprises an interface component 102. Interface component 102 may comprise a new loan application component 702 configured to obtain information pertaining to a loan application. Information pertaining to a new application may be uploaded to transaction portal component 704. Transaction portal component 704 may comprise one or more portals containing a user interface as disclosed herein for interfacing with the system 800. In embodiments, transaction portal component 704 may comprise a web browser, application, mobile device application, or another computer-based interface for interacting with an internet based system. System 800 may comprise a web3 bridge component 710 so that one or more users of transaction interface component 704 may interact or otherwise obtain access to one or more blockchain networks of system 800.

In embodiments, system 800 may comprise API component 708. API component 708 may comprise an application programming interface configured to populate fields of one or more smart contracts generated by deal creation contract 712. In embodiments, API component 708 gathers information pertaining to new loan application component 702 and submits the information to a deal creation contract 712. In implementations, API component 708 may be configured to receive input or authorizations from one or more parties interacting with system 800. In embodiments, API component 708 may be configured to call functions authorized by one or more parties of system 800 depending on the recognized permissions of the party calling the function. In embodiments, the information submitted to deal creation contract 712 may be information pertaining to a new loan application transaction, including identification information of an originator, a loan seekers, one or more market makers, and information pertaining to the specifics of the loan application and valuation information of one or more assets, including proof of ownership or title. As one of ordinary skill in the art would appreciation, various types and forms of information pertaining to a new loan application may be received by deal creation contract 712 that would be necessary or preferable for a loan transaction.

In implementations, system 800 may comprise a storage contract 722. Storage contract 722 may serve as a static registry of identifications of deals corresponding to one or more loan applications, identifications of parties participating in system 800, and price at which tokens are minted at for each time tokens are minted by system 800. As disclosed herein, system 800 may require various authentications, validations, and transactions. Storage contract 722 may be configured to store information pertaining to the various authentications, validations, and transactions such that the one or more smart contracts of system 800 may access the information upon request.

Deal creation contract 712 may comprise a smart contract operating on the one or more blockchain networks of system 800. In embodiments, deal creation contract 712 may comprise a deal smart contract template that sets the form for loan originations that are received through transaction portal component 704. Deal creation contract 712 may be configured to create a new smart contract based deal contract for every loan origination received through transaction portal component 704. In implementations, deal creation contract 712 processes information received through transaction portal component 704 and populates one or more fields contained within a deal smart contract template pertaining to a new loan application for a tokenized SAN. In implementations, deal creation contract 712 comprises a function that is called by API component 708 that creates a new smart contract deal and registers the deal on storage contract 722. In embodiments, an identification of the smart contract deal may be stored on storage contract 722. The code of the deal itself may also be stored on smart contract 722. Deal creation contract 722 thus creates smart contract-based deals pertaining to new loan applications and creates a valid registry of created deals on storage contract 722.

System 800 may comprise a core contract 714 which may govern the transaction between the system 800 and one or more market makers seeking to purchase tokens related to the created deal smart contract. In embodiments, core contract 714 may register all details about a new loan application submitted through transaction portal component 704, including, but not limited to a loan amount, an appraised value of an asset underlying a loan, a combined loan-to-value, location information pertaining to the loan or the underlying asset, including a zip code, a deal smart contract identification as stored on storage contract 722, one or more approvals, verifications, or authentications received from oracle contract 716, party identifications, including the verification identification and credentials of one or more originators or market makers interacting with system 800, the market value of tokens created by system 800, the number of tokens to be minted in a transaction pertaining to a new loan origination, which may be calculated by the loan amount divided by the calculated token value, and the digital wallet or identification information of one or more market makers and trust institutions interacting with system 800.

Core contract 714 may comprise one or more functions governing the transaction between the system 800 and one or more market makers seeking to purchase tokens related to the created deal smart contract. In implementations, core contract 714 comprises a check asset valuation function called by the API component 708 which calls oracle contract 716 to check the valuation of the asset of a new loan application. The check asset valuation function may be configured to return a true or false based on a determination made by oracle contract 716. Core contract 714 may comprise a get token value function. The get token value function may be configured to calculate or receive the current or historic market value of tokens created by system 800. In implementations, the get token value may be configured to receive the current token value from oracle contract 716. In implementations, oracle contract 716 may receive the token value from trust underwriting API component 718.

System 800 may comprise a trust underwriting API configured to receive information corresponding to a new loan application, including at least the value of the loan and the value of an asset underlying the loan. In implementations, the trust underwriting API 718 may access off-chain information pertaining to the value of the asset, as discussed herein.

System 800 may comprise an oracle contract 716 configured to check the trust underwriting API 718 to validate the value of the asset that was submitted by the deal contract. Through the trust underwriting API 718, the oracle contract 716 may use on-chain or off-chain information, or both, and authenticity proofs to validate the value of an asset value on-chain. In implementations, oracle contract 716 may provide a verification to core contract 714 indicating that it has validated an asset value and that a deal may proceed. In implementations, oracle contract 716 may determined the amount of tokens corresponding to a given loan application that may be minted based on the determined, validated asset value. Oracle smart contract 716 may be configured to determine an updated market price for tokens created by system 800 and communicate the updated market price to the core contract 714.

As discussed herein, a trust institution or one or more administrators may participate in operating the system 800. In implementations, the market rate, or price of the tokens created by the system may be determined by one or more parties, including autonomous smart contract parties, in order to determine the number of tokens to create, mint, or generate for a given token transaction and the price at which a trust institution, or an administrator may retire one or more tokens.

In implementations, the price of a token unit may be described by the variable $\hbar$. Its purpose may be to set the ratio of tokens minted per dollar of home equity secured by a trust institution's primary investing activity, and to set the maximum price, in dollars, that a trust may pay per token whenever it uses its proceeds to repurchase and retire them. A trust institution participating in system 800 may be similar to trust institution 724 as described on FIG. 7. The programmatic application of $\hbar$ to these transactions allows a trust institution to fulfill its obligations in a predictable and rational way, without the discretion of centralized fund managers or the influence of speculative secondary markets. Token owners will know that tokens will always be issued and retired at $\hbar$, and that $\hbar$ will only change with the value of the asset equity secured as proscribed below due the immutable functionality of one or more smart contacts operating within the system 800.

$\hbar$ may generally describe the ratio of the value of the trust institution's portfolio to the number of tokens in circulation. In implementations, a trust institution may make monthly assessments of the assets in its portfolio, using home price indexes published by the Federal Reserve Bank of St. Louis and industry standard accounting methods, then publishes a per-token value index using a publicly available API. This $\hbar$ value is then used in all loan originations and retirement smart contracts. The institution may use proprietary software provided by to report and publish this $\hbar$ value to an entire blockchain ecosystem, making its reports available to investors, auditors and regulators.

In implementations, the price of the token may be determined by the oracle smart contract, or a third party validator, wherein the price of a token may be determined described by the equation: $\hbar=(QV+QC)/(TS-RS)$ wherein, $\hbar$ is the price of the token; QV is a qualified value corresponding to a loan amount; QC is a qualified cash value corresponding to an available amount of cash; TS is the total number of tokens generated by the system; and RS is the total number of tokens retired by the system.

In implementations, a "Qualified Value" ("QV") may generally represent the value of the assets secured by the loans associated with one or more tokens created by the system 800. In implementations, a QV may be based on a third-party licensed appraisal. For example, all homes encumbered by tokenized loans may be appraised by a third-party, licensed appraiser using appropriate comparable sales and state mandated methodology. This appraisal sets the starting value for a home, and thereby the note which encumbers it. These values may be double-checked by the Oracle prior to origination, providing an automated second opinion on the appraised value accepted by the Trust. Notes, or other debt instruments associated with an origination, are considered to start with a value equal to their principal until the value of the underlying home changes. (i.e., a loan for $10,000 has a QV of $10,000 following the close of origination.)

A QV may also be based on a public pricing index, such as the S&P Dow Jones or the U.S. Federal Housing Finance Agency Home Price Indexes. During the note's lifecycle, asset prices are likely to change. An increase to the value of a secured asset increases the value of the shared appreciation notes, because borrowers are obliged to repay the note's principal plus a share of the appreciation in their asset value. A decrease to the value of the asset does not reduce the amount due from the borrower, which never drops below the note's principal. It does decrease the "loan-to-value" ratio of the loan, increasing the risk that a borrower might default, or that an asset may sell for a price too low to recover the full amount due. The change in value of each asset may be based on changes to a home price index published by the Federal Reserve Bank of St. Louis, as determined by the oracle contract 716, assigned by the county where the home is located. When a note matures, is repaid, or otherwise removed from the portfolio, its realized value in cash stands as the final measure of its value and its impact on the value of $\hbar$, after reserves and expenses are deducted. This amount is called the asset's "Qualified Return." The market value of assets, such as homes, may be updated by the system 800 on a periodic basis. The Present Market Value of each home used in the portfolio calculation may be adjusted in proportion to any changes to its local home price index in a given month.

A "Qualified Cash" value (QC) may be correspond to an available amount of cash to a trust institution operating with the system 800, as described herein. A trust institution may use its proceeds from its investments, minus short term reserves, to purchase and retire tokens at price $\hbar$. When the trust institution receives proceeds from a loan repayment, it reports the sale of the asset and reserves a portion of the proceeds for short term reserves, setting aside the rest as Qualified Cash. The trust institution then reports this amount monthly along with the other updates to the value of $\hbar$. This amount is available to retire tokens at $\hbar$ through the system 800, forming the basis for liquidity and returns for the token ecosystem. A trust institution may have a board of directors that sets appropriate amounts for operation reserves, and releases any unused operational funds into Qualified Cash at the end of any fiscal year.

The contract that represents the distributed ledger of the tokens is the sole source of truth for the current token supply (TS), due to the immutable nature of blockchain smart contracts. One or more participants of system 800 may read this value directly from the blockchain whenever calculating $\hbar$. Similarly, tokens that have been retired.

A trust institution may decide to purchase tokens by providing a digital authentication. The tokens it purchases may be retired to a wallet that is programmed to restrict future transfer of the purchased tokens. When a trust institution retires tokens, the tokens may be distributed in a retirement contract which locks them out of human hands forever. Just like the Token Supply, one or more participants of the system 800 reads the up to date retired supply (RS) from this contract when calculating $\hbar$ by analyzing the blockchain data.

Core contract 714 may comprise a function configured to confirm that a new application submitted through transaction portal component 704 passed underwriting criteria required by oracle contract 716 and trust underwriting API 718. In implementations, this function may be configured to register verifications made by oracle contract 716 and trust underwriting API 718 in storage contract 722. In implementations, core contract 714 may comprise a function to register an updated value of the tokens of system 800 in storage contract 722.

The system 800 may provide a suite of software tools to the to facilitate the management and implementation of $\hbar$ and the origination and retirement of homium tokens. This software may integrated with the Ethereum MainNet and the FRED public API to update values used in the calculation.

In implementations, one or more identified market makers or purchasers may provide input to core contract 714 indicating a desire to purchase one or more tokens corresponding to one or more tokens created by system 800. In implementations, core contract 714 may be configured to update an allocation of one or more tokens to one or more of the purchasing market makers. In embodiments, the updated allocation corresponds to amount of currency and/or a currency equivalent spent by the one or more market makers to purchase tokens created by system 800. Core contract 800 may identify the digital wallets or addresses corresponding to the one or more market makers and store the digital wallets or addresses corresponding to the one or more market makers in storage contract 722 in association with purchase tokens. In implementations, core contract 714 may comprise a function to set an initial market maker address upon receiving input indicating a purchase by a market maker. In implementations, the input from market maker may be received through web3 bridge component 710. That is, one or more market makers may communicate with core contract 714 a willingness to purchase one or more tokens through a web3 bridge component, such as Metamask. In implementations, core contract 714 may set an address corresponding to a service provider for an allocation of a fee.

In implementations, core contract 714 may comprise a function configured to approves a deal and confirm one or more destination addresses for a token delivery. In embodiments, core contract 714 may be configured to receive funds from one or more market makers. In embodiments, core contact 714 is configured to receive funds in the form of cryptocurrency or tokens from one or more market makers. Core contract 714 may be configured to confirm that the sender of the funds corresponds to one or more wallet addresses or identifications for one or more recognized market makers. In certain implementations, core contract 714 may be configured to compare a sender's address to one or more wallet addresses or identifications stored in storage contract 722. In other implementations, core contract 714 may be configured to accept input from a trust institution with privileged permissions to approve a deal. In certain embodiments, the trust institution may signify to core contract 714 that funds have been received from one or more market makers. Upon receipt of currency or currency equivalent, core contract 714 may be configured to approve of a deal relating to a tokenized loan or tokenized SAN. Market makers may provide input, approve a transaction, or otherwise interact with core contract 714 through a blockchain network or web3 bridge component 710. Core contract 714 may be configured to cancel or pause a deal that is determined by core contract 714 to no long meet established deal criteria. In implementations, the core contract 714 may be configured to accept input from a closing agent that a deal corresponding to a loan has been closed. In example embodiments, a closing agent may have privileges recognized by core contract 714 and system 800. For example, a closing agent may be registered with system 800 as being an authorized agent able to confirm that a deal has closed.

After core contract 714 has determined that criteria for a deal have been met and has received deal confirmation from at least the one or more market makers and the oracle contract, core contract 714 may be configured to create an escrow contract 724. Escrow contract 724 may be a smart contract configured to hold tokens created by system 800. In embodiments, escrow contract 724 may be configured to register the wallet address or identification information of one or more market makers that are participating in a deal. In implementations, escrow contract may receive the wallet address or identification information of one or more market makers from storage contract 722. In implementations, escrow contract 724 may be configured to permit withdrawal or distribution of one or more tokens to one or market makers after distribution criteria have been met. In embodiments, the distribution criteria may comprise an on-chain verification that tokens have been held in the escrow contract 724 for a given time period, in accordance with a regulatory requirements. In other implementations, the distribution criteria may comprise an on-chain verification from an identified trust institution that certain regulatory criteria have been met pertaining to the distribution of the tokens held in the escrow contract 724.

Upon confirmation from core contract 714 that all deal criteria have been met, core contract 714 may be configured to decide a number of tokens to mint. As disclosed herein, the number of tokens decided to be minted may be based on one or more of the value of an asset corresponding to a loan application, the updated price of the tokens created by system 800, a qualified cash value, and the number of retired tokens. In implementations, information pertaining to the number of tokens to be minted determined by core contract 714 may be stored in storage contract 722 in association with all other relevant deal information, including at least identification of the deal smart contact and the parities to the contract. In implementations, core contract 714 may and call on minting contract 718 to create new tokens. In implementations, core contract 714 provides an on-chain verification that all deal criteria have been met before commanding minting contact 718 to create tokens corresponding to deal. In certain implementations, core contract 714 may be configured to cancel a deal upon an indication from one or more participants of system 800.

Minting contract 718 may be configured as the only party and/or smart contract with the power to create tokens in system 800. In embodiments, minting contract 718 may validate a deal by checking the registry of valid deals stored in storage contract 722. In embodiments, minting contract 718 may require a completed checklist of valid metadata and on-chain confirmations before it can proceed with minting tokens. In embodiments, the functions that govern the confirmations may be called by API component 708, as well as by the one or more market makers, one or more identified trust institutions, or one or more closing agents operating on an Ethereum network client.

System 800 may comprise a token contract 720 that may be configured to mint one or more tokens corresponding to a loan application upon approval from minting contract 718. In implementations, token contract 720 may be configured to receive input from minting contract 718 corresponding to a number of tokens to be minting. In embodiments, token contract 720 may receive information pertaining to the number of tokens to create from storage contract 722. Token contract 720 may be configured to create tokens in accordance with the ERC-20 token standard. In embodiments, token contract 720 may be configured to transfer one or more minted tokens to escrow contract 724.

Upon verification that all deal criteria and necessary criteria, as discussed above, escrow contract may be configured to transfer one or more tokens to a market maker destination 728. In implementations, a market maker destination 728 may comprise the wallet address of one or more market makers. Escrow contract 724 may be configured to distribute one or more tokens to one or more addresses of market maker destination 728 based on a determined allocation as discussed above. In implementations, escrow contract 724 may be configured to transfer minted tokens or a digital asset transferred from one or more market makers to an administrator token destination 726. In implementations, the administrator token destination 726 may comprise one or more digital wallets corresponding to one or more administrators of system 800, including one or more trust institutions, one or more closing agents, one or more originators, or one or more loan seekers, as disclosed herein. In implementations, the tokens or digital assets transferred by escrow contract 724 to administrator token destination may represent a fee for services, a withdrawal of excess digital assets contained in escrow contract 724, or a refund for digital assets accidentally submitted to system 800.

In various embodiments, a trust institution may be configured to buy token created by system 800. In implementations, system 800 may configured to transfer one or more tokens purchased by a trust institution to a digital wallet address that is verifiably programmed to lock the one or more tokens away from future transfer. These "burn" token addresses may be unowned wallets (such as the 0x0 address) or a smart contract deployed specifically to interact with system 800 or other applications or protocols to receive and burn tokens on behalf of the trust institution. As one of ordinary skill in the art would appreciate, these solutions may differ based on the context in which the buy-back purchases are made.

System 800 may comprise an audit component 706 configured to display, present, or make available information logged, stored, or recorded in storage contract 722. In various implementations, audit component 706 may be available to the public or only available to one or more participants of system 800 depending on their respective permissions. In implementations, audit component 706 may be configured to display, present, or make available a portion of information logged, stored, or recorded in storage contract 722 to one or more participants of system 800 depending on their respective permissions.

In accordance with the embodiments discussed above, the system 800 may comprise on or more smart contracts comprises executable code operating on one or more blockchain networks. In certain embodiments, the blockchain network may be the Ethereum network. In implementations, the executable code of the one or more smart contracts may operate various functions called by other smart contracts or participants of the system 800. As one of ordinary skill in the art would appreciate, any number of smart contracts may be deployed to implement the functionalities described herein. As disclosed above, one or more smart contracts of the system 800 require various authorizations, verifications, inputs, and/or other information in order to proceed with a subsequent step. As one of ordinary skill in the art would appreciate, an authorization, verification, or other input, need not necessarily be received from a particular smart contract, but can instead be received, requested, or obtained from any smart contract or registry containing the required information.

Figure 9:
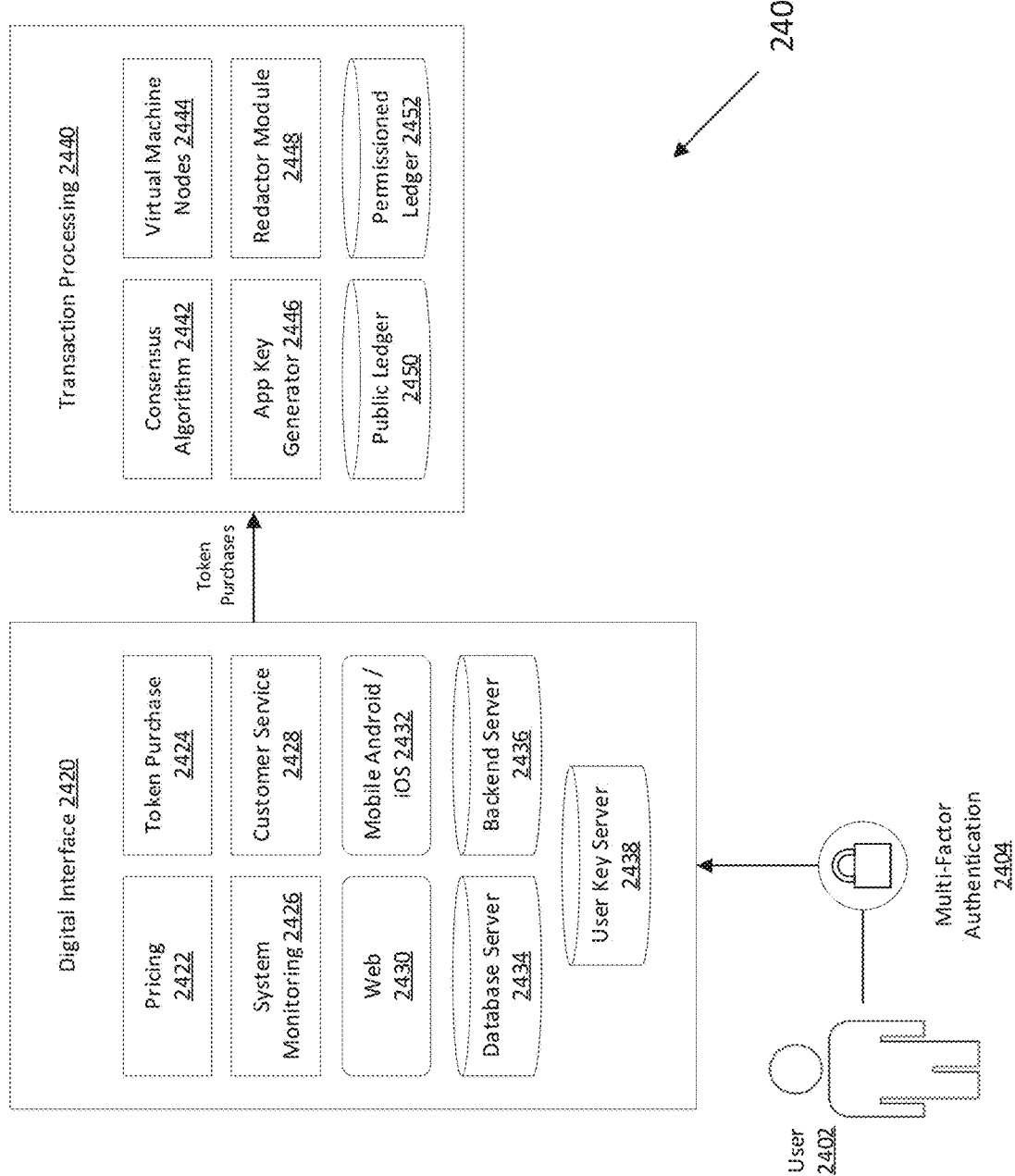
FIG. 9 illustrates a digital interface component and a transaction processing component for the computerized system for securely generating and distributing cryptographically secure, digital tokens.

In some implementations, the one or more features described herein may implemented via one or more separate applications. For example, FIG. 9 illustrates a block diagram of an example of a tokenized SAN system 2400 comprising separate applications configured to implement one or more features described herein, in accordance with one or more implementations of the invention. In various implementations, tokenized SAN system 2400 may comprise a system the same as or similar to tokenized SAN system 120. Tokenized SAN system 2400 may include a digital wallet interface application 2420, a transaction processing application 2440, a post processing application 2460, and/or one or more other components. Digital wallet interface application 2420 may be configured to generate and manage digital wallets configured specifically for users through which users may manage, inspect, audit, or make transaction relating to one or more tokens. Transaction processing application 2440 may be configured to process transactions occurring in the blockchain-based tokenzied SAN system and write verified transactions to public and/or permissioned ledgers maintained by the system, as described herein. Post processing application 2460 may be configured to analyze the transactions (or claims) processed by the system and settle payments to administrators as may be required for certain on-chain transactions, as described herein.

In various implementations, each user (e.g., a user 2402) may be configured to tokenized SAN system 2400 via a digital interface for that user. In some implementations, each user 2402 may comprise an originator, a market maker or purchaser, an administrator, an auditing authority, or other user, and the digital interface for that user may comprise one or more portals, as described herein with respect to FIG. 1 and FIG. 2. In various implementations, multifactor authentication 2404 may be utilized to authenticate the identity of the user (i.e., user 2402) attempting to access a digital wallet. In some implementations, a component the same as or similar to authentication component 304 may be configured to manage one or more authentication factors. The one or more authentication factors may include provision of a PIN, SMS verification, QR code authentication, fingerprint analysis, and/or one or more other authentication factors. In some implementations, a digital wallet application of tokenized SAN system 2400 may interface with one or more components of a user device associated with a user to verify the identity of the user (e.g., to perform a multifactor identity authentication). For example, a digital wallet application of tokenized SAN system 2400 may access one or more hardware components of a user device (e.g., a camera, a fingerprint sensor, and/or one or more other hardware components) to verify the identity of a user.

Digital interface application 2420 may be configured to generate and manage digital wallets configured specifically for consumers, service providers, and/or other users of a tokenized SAN system. In some implementations, digital interface application 2420 may comprise a component or set of components the same as or similar to the various components described herein. In various implementations, digital interface application 2420 may be configured by one or more computer program instructions described herein to implement one or more features described herein. The one or more features implemented by digital interface application 2420 may result in the generation and management of digital wallets configured specifically for consumers, service providers, and/or other users of a tokenized SAN system. In various implementations, digital wallets generated and managed by digital interface application 2420 may be provided via one or more technology platforms. For example, a digital wallet may be generated for each user that may be accessed via a web-based interface (i.e., web 2430), a mobile application (i.e., a mobile application provided via the Android and/or iOS mobile operating systems 2432), and/or one or more other technology platforms. In various implementations, digital interface application 2420 may include a database server 2434, a backend server 2436, a user key server 2438, and/or one or more other databases. In some implementations, user key server 2438 may comprise a database the same as or similar to key datastore 214 depicted in FIG. 2 and described further herein. In various implementations, token purchases via a digital marketplace and accessed through a digital wallet generated and managed by digital interface application 2420 may be processed and managed by transaction processing application 2440.

In various implementations, the tokenized SAN system described herein may be configured to manage keys that facilitate access to the records and/or other information stored by the tokenized SAN system and enable the various features of the tokenized SAN system. As described herein, the keys may comprise public keys and private keys for digital wallets of the tokenized SAN system. Each key may comprise a long string of numbers and/or letters. In some implementations, public keys and private keys may comprise long strings of numbers and/or letters linked through a cryptographic algorithm that was used to create the keys. In some implementations, public keys may be administered via a public key infrastructure (PKI) comprising a set of roles, policies, and procedures needed to create, manage, distribute, use, store, and revoke digital certificates and manage public-key encryption. In some implementations, public keys may be stored by tokenized SAN system (e.g., in key datastore 214 or user key server 2438) and private keys may be held by the individual user associated with that private key. Access to specific components of the tokenized SAN system may be achieved by providing the private key that matches the public key associated with that component.

Transaction processing application 2440 may be configured to process transactions occurring in the blockchain-based tokenized SAN system and write verified transactions to public and/or permissioned ledgers maintained by the system. In some implementations, transaction processing application 2440 may comprise a component or set of components the same as or similar to tokenized SAN engine 210. In other words, the various components, features, or processes described herein with respect to, or as being implemented by, tokenized SAN engine 210 and transaction processing application 2440 may be included within and/or implemented by tokenized SAN engine 210 and/or transaction processing application 2440. In implementations, transaction processing application 2440 may be configured to record one or more digital authorizations on public ledger 2450 or permissioned ledger 2452 corresponding to a token transaction agreement.

In various implementations, transaction processing application 2440 may be configured by one or more computer program instructions described herein to implement one or more features described herein. The one or more features implemented by transaction processing application 2440 may result in the processing of transactions occurring in the blockchain-based token system and the recordation of verified transactions to public and/or permissioned ledgers maintained by the system. In various implementations, the one or more features implemented by transaction processing application 2440 may include implementing a consensus algorithm 2442, managing one or more virtual machine nodes 2444, application key generation 2446, a redactor module 2448, and/or one or more other features. In various implementations, transaction processing application 2440 may be configured to record verified transactions to one or more public ledgers 2450 and/or one or more permissioned ledgers 2452 of transaction processing application 2440.

Figure 11:
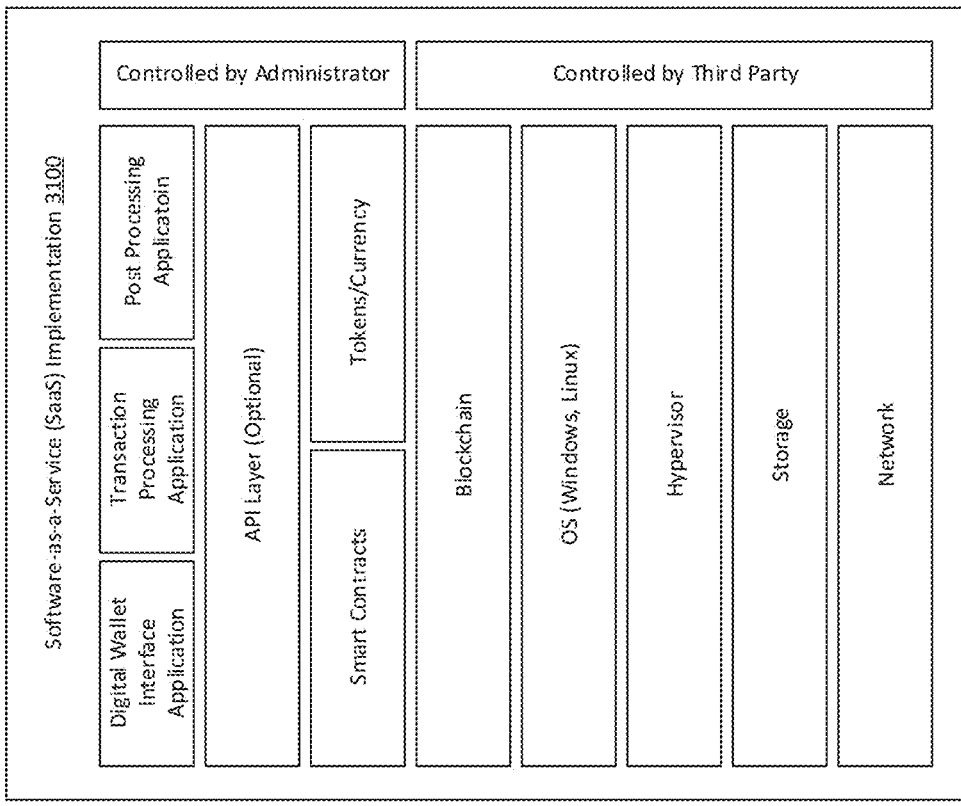
FIG. 11 illustrates a Software-as-a-Service implementation of the system in accordance with the embodiments disclosed herein.
Figure 10:
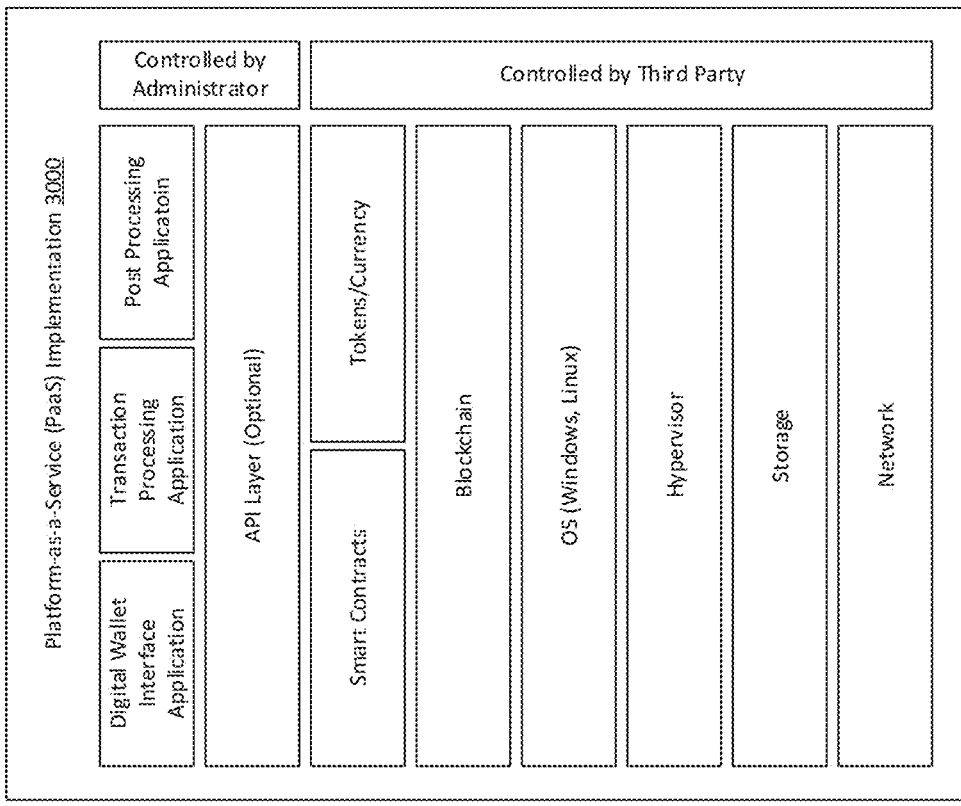
FIG. 10 illustrates a Platform-as-a-Service implementation of the system in accordance with the embodiments disclosed herein.

FIGS. 10 and 11 each illustrate a block diagram of an example implementation of a tokenized SAN system, in accordance with one or more implementations of the invention. FIG. 10 illustrates a block diagram of an example of a tokenized SAN system provided via a platform-as-a-service (PaaS) implementation 3000, in accordance with one or more implementations of the invention. FIG. 11 illustrates a block diagram of an example of a tokenized SAN system provided via a software-as-a-service (SaaS) implementation 3100, in accordance with one or more implementations of the invention.

Each example implementation depicted in FIGS. 10-11 may comprise an example hardware architecture. For example, each example implementation depicted in FIGS. 10-11 may comprise one or more layers of the tokenized SAN system. In various implementations, the one or more layers may include an application layer. The application layer may be configured to execute a digital wallet interface application (e.g., digital wallet interface application 2420), a transaction processing application (e.g., transaction processing application 2440), a post processing application (e.g., post processing application 2460), and/or one or more other applications configured to implement the features described herein. In certain embodiments, the blockchain network may be maintained by a third party not directly involved in tokenized SAN system, such as a passive service provider.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 202 may be programmed by one or more additional instructions that may perform some or all of the functionality attributed herein to one of the instructions.

The various instructions described herein may be stored in one or more storage device(s) which may comprise random access memory (RAM), read only memory (ROM), and/or other memory. The storage device may store the computer program instructions (e.g., instructions 204) to be executed by processor(s) 202 as well as data that may be manipulated by processor(s) 202. The storage device may comprise, hard disks, optical disks, tapes, decentralized hardware architectures, or other storage media for storing computer-executable instructions and/or data.

Implementations of the disclosure may be made in hardware, firmware, software, or any suitable combination thereof. Aspects of the disclosure may be implemented as instructions stored on a computer-readable medium, which may be read and executed by one or more processors. A computer-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although illustrated in FIG. 2 as a single component, computer system 200 may include a plurality of individual components (e.g., computer devices) each programmed with at least some of the functions described herein. In this manner, some components of computer system 200 and/or associated user devices may perform some functions while other components may perform other functions, as would be appreciated. Furthermore, it should be appreciated that although the various instructions are illustrated in FIG. 1 as being co-located within a single processing unit, in implementations in which processor(s) 202 include multiple processing units, one or more instructions may be executed remotely from the other instructions.

The various components illustrated in FIG. 1 and FIG. 2 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and FIG. 2, as well as in other drawing Figures, different numbers of entities than those depicted may be used. Furthermore, according to various implementations, the components described herein may be implemented in hardware and/or software that configure hardware.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein. For example, the use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Reference in this specification to "one implementation", "an implementation", "some implementations", "various implementations", "certain implementations", "other implementations", "one series of implementations", "embodiments," or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

As discussed herein a "token" is not intended to be limited to a whole or single unit of value, but may refer to a fraction of a token or any numerical representation of a token, coin, or digital asset as discussed herein. The term "party" does not necessarily refer to a single person, but may refer to a group of persons, an entity or institution acting at the direction of a person or group of person, a smart contract or other programmable component capable, or a series or group of smart contracts. As discussed herein, tokens may be "generated" by being created or issued as new tokens on a blockchain network or by simply being transferred from a wallet containing tokens that were previously created or generated but not made available to one or more persons. In implementations, the parties defined herein, such as an "originator," "market maker," "purchaser," "administrator," or other parties may refer to a single person, a group of persons, or an institution.

The language used herein has been principally selected for readability and instructional purposes, and it may not have been selected to delineate or circumscribe the inventive subject matter. Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A computerized system for processing tokenized loans and securely generating and distributing cryptographically secure, digital tokens for digitally representing ownership of an interest in a tokenized loan, the system comprising:
   at least one first processor;
   a first memory storing computer instructions executable by the at least one processor, which when executed cause the first processor to perform operations comprising:

generate and manage digital wallets for different classes of users of the system;

generate and display portals comprising user interfaces for displaying information to and receiving input from the different classes of users, the portals configured to display different features to the different classes of the users based on their respective permissions stored in the system; and a database for storing information pertaining to a loan origination transaction, the loan origination transaction information representing an asset, an asset value of the asset, and a confirmation received by the system from one or more identified parties in the form of a digital authentication;

at least one node of a blockchain network, wherein the blockchain network comprises a distributed computer system, the at least one node comprising a second processor and a second memory storing instructions executable by the second processor which when executed cause the second processor to operate a virtual machine, wherein the virtual machine is configured to:

receive, from one or more of the parties, through the transaction portal, an authenticated digital confirmation;

receive, from a third party validator smart contract, an authenticated digital confirmation, wherein the authenticated digital confirmation received from the third party validator smart contract is based on a validation of the asset value, wherein the asset value validation is based on information pertaining to the value of the asset, received from one or more sources not originating on the blockchain network and the loan origination transaction information;

receive, from an administrator of the system, an authenticated digital confirmation;

generate a token transaction smart contract responsive to receiving the authenticated digital confirmation from the administrator of the system, wherein the generated token transaction smart contract comprises a unique transaction identification and an identification of one or more parties to the token transaction smart contract, including at least a purchaser, the administrator, and the third party validator;

store permissions for the administrator of the system and for the third party validator smart contract in the token transaction smart contract, wherein permissions for the administrator are exclusive permissions for the administrator to transmit confirmations to be received by the system, and permissions for the third party validator smart contract are exclusive permissions for the third party validator smart contract to provide an asset value validation to be received by the system; and store the token transaction smart contract on at least one node of the blockchain network based on the information pertaining to the loan origination transaction;

store the authenticated digital confirmations on the at least one node of the blockchain network; and determine distribution information associated with distribution of tokens to the one or more parties to the token transaction smart contract, the distribution information comprising:

a number of tokens to be generated in the token transaction smart contract; and an allocation of tokens to the purchaser based on a transaction amount;

generate one or more cryptographically secure digital tokens based on the distribution information; and deliver one or more of the cryptographically secure digital tokens to a digital address of the one or more parties based on at least the distribution information associated with the distribution of tokens.

2. The system of claim 1, the instructions further executable by the second processor to operate the virtual machine to:

receive, from the third party validator smart contract a maximum available loan amount based on the loan origination transaction information.

3. The system of claim 1, the instructions further executable by the second processor to operate the virtual machine to:

receive an authenticated digital confirmation recorded on the blockchain network from one or more purchasers indicating a confirmation to purchase tokens, the confirmation representing an agreement to a transaction based on the token purchase agreement, the transaction comprising the transaction amount;

generate an escrow account that is configured to enable the transfer of tokens when one or more conditions have been verified; and transfer the generated tokens from the escrow account to the purchaser after a condition has been verified.

4. The system of claim 3, wherein the token transaction smart contract further comprises an identification of a closing agent; and wherein a verified condition comprises the system receiving one or more of:

a verification that a threshold period of time has elapsed since one or more tokens were received by the escrow account;

a verification in the form of a digital authentication from a party identified in the token transaction smart contract that regulatory criteria have been satisfied; and a verification in the form of a digital authentication from the identified closing agent, wherein the verification represents a confirmation that the loan origination transaction has closed.

5. The system of claim 1, the instructions further executable by the second processor to operate the virtual machine to:

automatically generate a first smart contract configured to create cryptographically secure, digital tokens on the blockchain network in response to an authenticated digital verification from one or more of the parties; and automatically generate a second smart contract configured to transfer cryptographically secure, digital tokens to an address in response to an authenticated digital verification from one or more of the parties.

6. The system of claim 1, the instructions further executable by the second processor to operate the virtual machine to:

automatically generate a smart contract stored on the blockchain configured to store information pertaining to the token transaction smart contract, a number of generated tokens, the price of a token, identification information for one or more parties, information pertaining to one or more transactions occurring on the system.

7. The system of claim 1, the instructions further executable by the second processor to operate the virtual machine to determine the price of a token, wherein the price of a token is described by the equation:

$$\hbar = \frac{QV + QC}{TS + RS}$$

wherein,
$\hbar$ is the price of the token;
QV is a qualified value corresponding to a loan amount;
QC is a qualified cash value corresponding to an available amount of cash;
TS is the total number of tokens generated by the system; and
RS is the total number of tokens retired by the system.

8. The system of claim 1, the instructions further executable by the second processor to operate the virtual machine to determine the price of a token, wherein the price of a token is directly proportional to the value of qualified assets and inversely proportional to the number outstanding tokens.

9. The system of claim 8, the instructions further executable by the second processor to operate the virtual machine to:
receive an authenticated digital confirmation recorded on the blockchain network from an administrator of the system representing a purchase of one or more tokens at the determined token price; and
retire the one or more purchased tokens to an account configured to restrict the transfer of the one or more purchased tokens.

10. The system of claim 8, wherein a number of tokens to be generated in the token transaction smart contract depends on the determined token price.

11. The system of claim 1, wherein the loan comprises a shared appreciation note.

12. The system of claim 1, the instructions further executable by the second processor to operate the virtual machine to: receive input from a web3 bridge.

13. The system of claim 1, wherein the third party validator smart contract comprises a public identification.

14. The system of claim 1, wherein the asset value validation further comprises determining that a combined loan-to-value ratio corresponding to the loan origination exceeds a threshold value.

15. The system of claim 1, wherein the information retrieved from the one or more sources not originating on the blockchain network comprises a home price index.

16. The system of claim 1, wherein the loan origination transaction information comprises a loan amount, an appraised asset value, a combined loan-to-value ratio corresponding to the loan origination, information corresponding to the location of the asset, an identification of an originator associated with the loan information, and a verification of a credential of the originator.

17. The system of claim 1, wherein the identification of the parties comprises a public identification on the blockchain network.

18. The system of claim 1, the instructions further executable by the second processor to operate the virtual machine to:
provide instructions to the third party validator smart contact to determine a qualified asset value, the qualified asset value determined by:
receiving information pertaining to the value of the asset from one or more sources not originating on the blockchain network;
validating the value of the asset;
receive the qualified asset value from the third party validator smart contract;
determine a current value of $\hbar$ for outstanding digital tokens based on the qualified asset value, wherein $\hbar$ is the price of the token, and the current value of $\hbar$ is proportional to the qualified asset value and inversely proportional to the current number of outstanding digital tokens.

19. The system of claim 1, further comprising a wallet management engine module configured to generate and manage digital wallets configured specifically for different classes of users, including one or more of: homeowners, loan originators, escrow agents, closing agents, market makers, oracles, and/or administrators; the digital wallets comprising a public key and a corresponding private key, and wherein the wallets are configured to require a user to input the private key to provide digital authentication for a transaction through their wallet and to cause the digital authentication to be recorded on the blockchain network.

20. The system of claim 1, comprising a digital marketplace component configured to generate and maintain information stored in a SAN datastore, wherein the SAN datastore includes data structures that define parameters relating to one or more of: SAN agreements, an associated list of identified loan originators, homeowners, market makers, and/or agents that participate in the system, according to the parameters.

21. The system of claim 20, wherein the SAN datastore comprises information relating to a loan backed by an asset including one or more of: the value of the loan, physical or digital loan-related documents, asset appraisal information, public records relating to the ownership of the asset, party and counter party identification, title information, and/or or information pertaining to the nature of the asset.

22. The system of claim 20, wherein the SAN datastore comprises information relating to the identities and respective permissions of the one or more classes of users of a tokenized SAN system, the permissions including one or more of; the users who are verified to submit a loan application to one or more of the administrators or oracles participating in tokenized SAN system; the authorized agents, administrators, market makers, originators, and homeowners; wherein the permissions are defined and associated with the specific identification of the authorized participants of the tokenized SAN system and stored in the system.

23. The system of claim 20, wherein the SAN datastore stores an identification of the various smart contracts created and operated by the system.

24. The system of claim 20, wherein the digital marketplace component is configured to cause a digital marketplace user interface to be generated and presented to a user through which the user can search for and select one or more tokens associated with a tokenized SAN, and which is operable, via input from a digital wallet, to enable the purchase and/or transfer of a selected token.

25. The system of claim 20, wherein the digital marketplace is configured to be integrated with a digital wallet application.

26. The system of claim 1, wherein the system is configured to: facilitate the creation of a tokenized SAN smart contract based on a loan agreement input by an originator to one or more administrators through the portal; enable an originator to submit loan proposals through the portal; and identify one or more originators with which one or more tokenized SAN smart contracts are associated.

27. The system of claim 1, wherein an originator portal comprises: a user interface configured to present to one or more originators, or homeowners associated with one or more originators having a first portion configured to enable the user to manage and upload documents relating to an originated loan to be tokenized by the system; and a digital wallet application.

28. The system of claim 1, wherein an agent portal is configured to generate and display an agent interface configured to enable an agent to: register with the system; access loan information corresponding to loans of one or more originators through the portal; and manage escrow accounts relating to transactions between market makers and originators.

29. The system of claim 1, wherein an admin portal is configured to generate and display an administrator user interface configured to enable an administrator of the system to view, inspect, and verify loan documents and information of originators.

30. The system of claim 1, wherein an admin portal is configured to: generate and display an administrator user interface configured to enable one or more oracles to view, inspect, and verify loan documents and information submitted by originators; and receive authorization from one or more oracles to provide authorization on the blockchain of a loan application of one or more originators.

31. The system of claim 1, wherein a market maker portal is configured to: generate and display a market maker user interface configured to enable one or more market makers with access to securely view and purchase cryptographically secured tokens representing ownership in one or more shared appreciation notes.

32. The system of claim 1, wherein the loan origination transaction information comprises a loan amount, an appraised asset value, a combined loan-to-value ratio corresponding to the loan origination, information corresponding to the location of the asset, an identification of an originator associated with the loan information, and a verification of a credential of the originator.

33. The system of claim 1, comprising a deal creation contract module comprising: a deal smart contract template that specifies a form for loan originations that are received through transaction portal component, the deal creation contract module being configured to create a new smart contract based deal contract for loan originations received through transaction portal component; process information received through transaction portal component and populate one or more fields contained within the deal smart contract template pertaining to a new loan application for a tokenized loan.

34. The system of claim 1, comprising a core contract module configured to register details about a new loan application submitted through transaction portal component, including, one or more of a loan amount, an appraised value of an asset underlying a loan, a combined loan-to-value, location information pertaining to the loan or the underlying asset; the core contract module configured to further register a deal smart contract identification as stored on a storage contract, one or more approvals, verifications, or authentications received from an oracle contract, party identifications, including the verification identification and credentials of one or more originators or market makers interacting with system,
- a get token value function configured to calculate or receive the current or historic market value of tokens created by system;
- a determination of the number of tokens to be minted in a transaction pertaining to a new loan origination, and the digital wallet or identification information of one or more market makers and trust institutions interacting with system.

35. The system of claim 1 comprising:
- a digital wallet interface application and a transaction processing application, the digital wallet interface application configured to generate and manage digital wallets that enable users to manage, inspect, audit, or make transaction relating to one or more tokens; and
- the transaction processing application configured to process transactions occurring in a blockchain-based tokenized SAN system and write verified transactions to public and/or permissioned ledgers maintained by the system.

* * * * *